US012211131B1

(12) United States Patent
Sadoughi Nourabadi et al.

(10) Patent No.: US 12,211,131 B1
(45) Date of Patent: Jan. 28, 2025

(54) COMPOSITE STOREFRONT IMAGE MANAGEMENT

(71) Applicant: Amazon Technologies, Inc., Seattle, WA (US)

(72) Inventors: Najmeh Sadoughi Nourabadi, Newcastle, WA (US); Rohith Mysore Vijaya Kumar, Campbell, CA (US); Vimal Bhat, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 17/935,796

(22) Filed: Sep. 27, 2022

(51) Int. Cl.
*G06T 11/60* (2006.01)
*G06T 7/194* (2017.01)
*G06T 7/60* (2017.01)
*G06T 7/70* (2017.01)
*G06V 10/74* (2022.01)
*G06V 10/762* (2022.01)
*G06V 10/774* (2022.01)

(52) U.S. Cl.
CPC ............. *G06T 11/60* (2013.01); *G06T 7/194* (2017.01); *G06T 7/60* (2013.01); *G06T 7/70* (2017.01); *G06V 10/761* (2022.01); *G06V 10/762* (2022.01); *G06V 10/774* (2022.01); *G06T 2207/10016* (2013.01); *G06T 2207/20081* (2013.01); *G06T 2210/12* (2013.01); *G06V 2201/09* (2022.01)

(58) Field of Classification Search
None
See application file for complete search history.

(56) References Cited

U.S. PATENT DOCUMENTS

| 2006/0064716 | A1* | 3/2006 | Sull ...................... G06F 16/784 715/201 |
| 2020/0167832 | A1* | 5/2020 | Pinel ...................... G06T 11/40 |
| 2021/0217443 | A1* | 7/2021 | Abraham ................ G06T 11/00 |
| 2022/0230274 | A1* | 7/2022 | Ge ......................... G06T 3/4038 |

OTHER PUBLICATIONS

Yan Wang, Tao Mei, Xian-Sheng Hua, "Community Discovery from Movie and Its Application to Poster Generation", 2011, Springer, Advances in Multimedia Modeling. MMM 2011.*
Wei-tao You, Hao Jiang, Zhi-yuan Yang, Chang-yuan Yang, Ling-yun Sun, "Automatic synthesis of advertising images according to a specified style", Aug. 5, 2020, Springer, Frontiers of Information Technology & Electronic Engineering, vol. 21, pp. 1455-1466.*

(Continued)

*Primary Examiner* — Robert Bader
(74) *Attorney, Agent, or Firm* — Lee & Hayes, P.C.

(57) ABSTRACT

Technologies are disclosed for managing composite storefront images. The composite storefront images can be generated utilizing portions of media content (e.g., visual content, such as videos, trailers, etc.), and templates generated based on sets of existing storefront images. Objects can be extracted from frames and composited together to generate course composite images. The course composite storefront images can be utilized to map the object portions onto the media content artwork styles to generate refined composite storefront images based on the templates.

20 Claims, 5 Drawing Sheets

(56) References Cited

OTHER PUBLICATIONS

Federico Perazzi, Anna Khoreva, Rodrigo Benenson, Bernt Schiele, Alexander Sorkine-Hornung, "Learning Video Object Segmentation from Static Images", Jul. 26, 2017, IEEE, 2017 IEEE Conference on Computer Vision and Pattern Recognition (CVPR).*

David Kadish, Sebastian Risi, Anders Sundnes Løvlie, "Improving Object Detection in Art Images Using Only Style Transfer", Jul. 22, 2021, IEEE, 2021 International Joint Conference on Neural Networks (IJCNN).*

\* cited by examiner

COMPOSITE STOREFRONT IMAGE MANAGEMENT

BACKGROUND

Service providers perform media content management associated with various types of media content. The service providers manage media content products, as well as information and services associated with the media content products. The media content management includes providing media content information, such as characteristics information, availability information, accessibility information, serviceability information, and so forth. The media content products are made accessible to users in various ways, such as by the service providers enabling the media content products to be downloaded, streamed, and so forth. The media content information includes storefront images representing the media content products. The storefront images are used to provide identification of the media content products, as well as to enable user access to the media content products and the media content information. The media content products and the media content information are obtainable via user selection of the storefront images.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
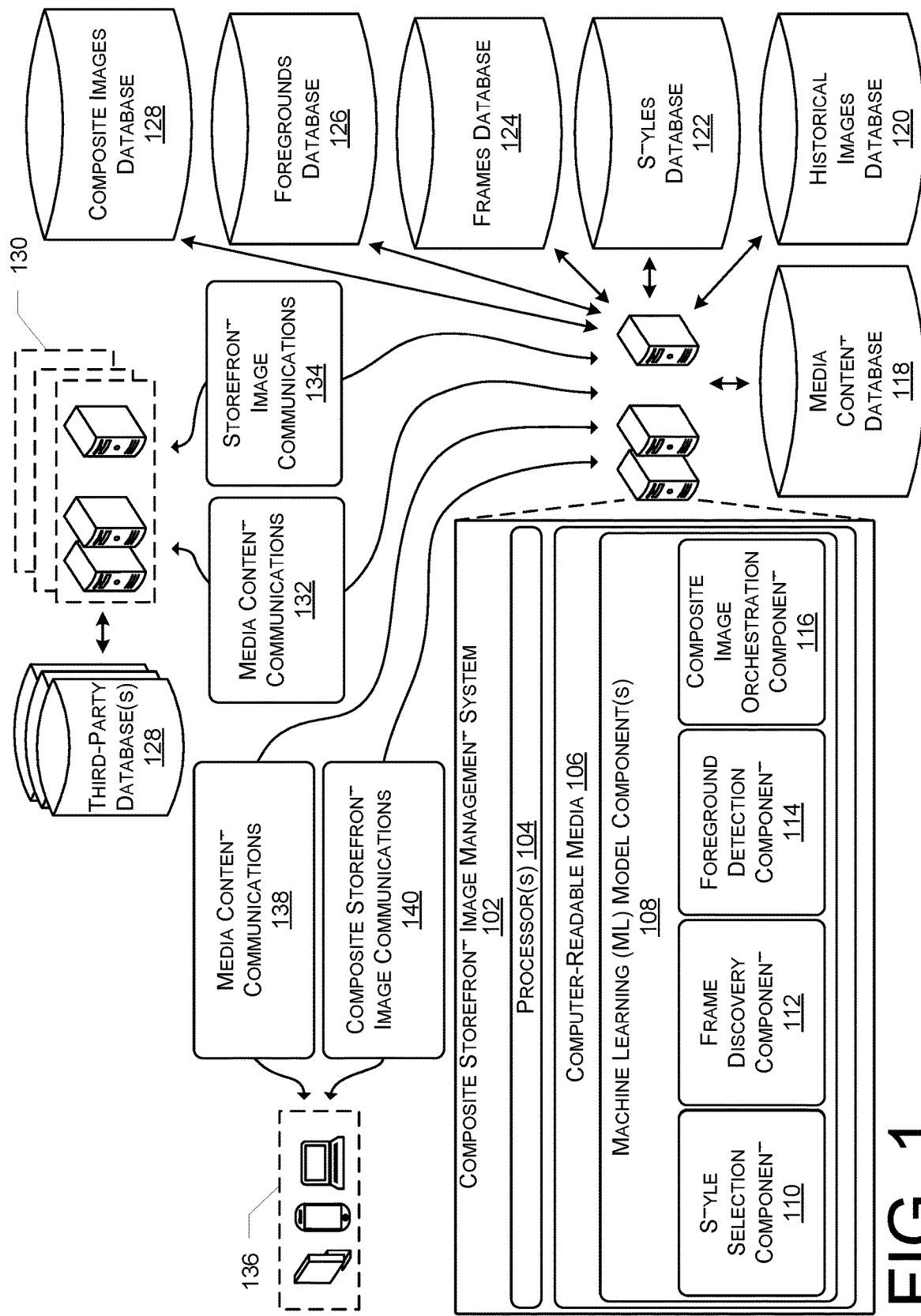
FIG. 1 illustrates a system-architecture diagram of an example environment in which a composite storefront image management system is utilized to manage composite storefront images.

Over the years, demands for amounts and varieties of different types of storefront images for media content products (e.g., images/artwork displayed in association with a movie, music album, book, television program, etc.) have continued to increase as desires and expectations associated with media content management grow and become more intricate and complex. This expansion with respect to storefront image usage enables the service providers to offer more personalized and meaningful user interactions and experiences associated with the media content. Manually created storefront images by artists and graphic designers convey information about, and characteristics of, the media content in condensed and visually appealing formats. However, limitations in availability of time, cost, and expertise required for manual creation of the storefront images create challenges in scaling the manual storefront image creation to keep up with expanding media content management needs and requirements. Single frame based storefront image generation effected by extracting and repurposing single frames of the media content provides a more efficient and less expensive way to obtain the storefront images. However, single media content frame based storefront images rarely depict, simply, comprehensively, and selectively, sufficient amounts of media content information and characteristics in comparison to the manually created storefront images. For instance, an image extracted from a frame of a movie likely would not represent the entirety of the movie, nor would the single frame convey sufficient information about the movie. Respective shortfalls of the manual-based and single frame-based storefront image generation impede optimization and diminish quality of service provider management, as well as user utilization, of the media content.

This disclosure is directed to techniques for utilizing composite virtual storefront image management (or "composite storefront image management") to manage composite virtual storefront images (e.g., automated composite storefront images) (or "composite storefront images"). The composite storefront images can be generated utilizing portions of media content (e.g., visual content, such as videos, trailers, introduction content, recap content, preview content, etc.). The portions, which can include objects, such as humans, buildings, vehicles, and so on, can be extracted from frames of the media content. The composite storefront images can be generated utilizing templates. The templates can be generated based on sets of existing storefront images, such as manually created storefront images. The object portions to be extracted from the frames can be determined based on the templates. The object portions can be extracted from the frames and composited together to generate course composite virtual storefront images (or "course composite storefront images") (or "course composite images") based on the templates. In some examples, the object portions composited together can be overlaid with title portions, such as textual representations of titles, title logos, and so on, to generate the course composite storefront images. The course composite storefront images can be utilized to map the object portions onto the media content artwork styles to generate refined composite virtual storefront images (or "refined composite storefront images") based on the templates. In some examples, the object portions can be mapped along with the title portions onto the media content artwork styles to generate the refined composite storefront images. The refined composite storefront images can be transmitted to computing devices of users for presentation of the refined composite storefront images to the users.

Determinations of the media content portions to be extracted from the media content can be performed utilizing the media content, metadata, and object analysis information, to generate extraction information associated with the media content. The metadata can include data, such as title names, title attributes, plot keywords, synopses, genres, summaries, screenplays, etc., associated with the media content. The object analysis information, which can include information associated with selected styles, selected frames, selected foreground portions of the frames, and selected background portions of the frames, can be utilized to determine the media content portions to be extracted from the media content. Media content portion identifiers associated with the media content portions to be extracted can be included in the extraction information, which can also include the media content, the metadata, and the object analysis information. The determination of the media content portions to be extracted from the media content can be performed utilizing, as trained machine learned (ML) models, ML models trained based on the training information, as discussed below:

Compositing of the media content portions extracted from the media content can be performed utilizing the extraction information, and composite virtual storefront image orchestration information (or "composite storefront image orchestration information") (or "composite image orchestration information"). The composite image orchestration information can include foreground frame portions (or "foregrounds"). The foregrounds can include foreground information, objects in the frames, object information associated with the objects, bounding boxes, and/or bounding box information. The bounding box information can be associated with the foreground frame portions associated with the media content portions, which can be extracted utilizing the bounding boxes. The composite storefront image orchestration information can further include composition information utilized to determine how to arrange the extracted media content portions within the course composite storefront images according to the selected styles. The composite storefront image orchestration information can further include style information utilized to map the course composite storefront images onto the selected styles to generate refined composite virtual storefront images (or "refined composite storefront images"). The compositing of the media content portions extracted from the media content can be performed utilizing the trained ML models.

The existing storefront images utilized to generate the templates can be determined based on historical media content artwork. The sets of the existing storefront images, which can be utilized to generate the templates, can be organized into clusters based on similarities between the existing storefront images in the clusters being greater than or equal to threshold similarities. Template information associated with the templates can be determined. The template information, which can include similar types of data as in the metadata, discussed above, can be utilized to identify the templates and to determine whether to use the templates for generation of the composite storefront images. The sets of the existing storefront images, which can be utilized to generate the templates, can be analyzed to determine training components (e.g., metadata, such as title names, title attributes, plot keywords, synopses, genres, etc.) utilized to train the ML models. The training components can include training bounding boxes associated with training objects in the sets of the existing storefront images.

In addition to the aforementioned benefits, computing resources, such as processing resources, memory resources, networking resources, power resources, and the like, may also be conserved by aspects of the techniques and systems described herein. For example, aspects of the techniques and systems described herein conserve memory resources. That is, by optimizing generation of the storefront images, service providers no longer have to store potentially irrelevant, inferior, or overly generic storefront images that are manually created or single frame based. Many of such storefront images, not being selectively generated and personalized for users are often never used, and become quickly outdated as trends and expectations for creation and utilization of storefront image change and evolve. Such outmoded storefront images, frequently becoming obsolete, often unnecessarily consume storage space.

Other aspects of the techniques and systems described herein provide computing resources improvements. That is, numerous and ineffective requests from users desiring to receive media content that would otherwise be received as a result of users receiving incomplete information regarding the media content can be reduced. As compared to existing technology, which does not include providing any storefront images in such cases in which manually created artwork is unavailable, or, at best, merely utilizes incomplete and overly simplistic single frame depictions of media content as storefront images, examples described herein include providing customized, selective, comprehensive, intricate, and visually attractive automated composite images to user devices. The composite images that provide thorough and accurate information regarding media content in condensed and intuitive formats enable users to easily identify and select media content to be streamed and/or downloaded. Because utilizing the automated composite storefront images results in a relatively fewer number of overall media content requests needing to be processed, computing resources that would otherwise be exhausted by utilizing the techniques according to existing technology are able to be allocated according the techniques described herein for other purposes. Moreover, computing resources according to techniques described herein can be utilized to extract content (e.g., objects, bounding boxes, foregrounds, backgrounds, logos, etc.) from media content frames efficiently and selectively, which can be utilized for composite storefront image generation and management. In comparison to existing technology that must extract large sized images from large numbers of frames in order to accumulate sufficient numbers of images to be repurposed as storefront images, the techniques and systems described herein conserve computing resources as a result of the efficient, selective, and individualized media content frame portion extraction utilized for the composite storefront image generation and management. The conserved resources can be allocated for other device tasks and/or functions, thereby reducing latency of the devices, increasing resource availability, and/or minimizing device failures and malfunctions.

Moreover, the techniques described herein optimize network performance by decreasing (e.g., significantly and/or substantially decreasing) levels of communications passed through and/or controlled by networks utilized by the communications management systems and user devices. The levels of communications can be reduced as a result of the composite storefront images enabling users to receive and identify media content information accurately and efficiently in a condensed and comprehensive format. Network performance can be improved based on elimination of unnecessary communications, thereby conserving network bandwidth for other purposes and/or reducing network latency. In addition, a reduced amount of communications being transmitted across various networks also will prevent possible data packet loss (e.g., messages being transmitted but not received by an intended recipient). Network malfunctions and/or errors that may otherwise occur according to existing technology can be also avoided. As a result, other communications identified, selected, generated, and/or exchanged by the network based on the elimination of unnecessary communications can be more reliably controlled, effectively managed, and/or efficiently processed by the network.

Other aspects of the techniques and systems described herein provide user interface improvements, such as minimizing the number of user interactions with a user interface when users are browsing storefront images, viewing information about media content, and selecting the storefront images to download or stream the media content. For instance, examples described herein provide for presenting customized storefront images that target concepts or characteristics associated with media content that has been identified as being historically of interest to a user. This allows for more efficient user selection of media content to view information about, or download or stream, the media content, without requiring the user to waste time and resources which might otherwise result from providing the user with existing generic or inferior storefront images. As compared to current technology, this allows for presenting media content based on fewer interactions (e.g., fewer "clicks") with a user interface. Other examples described herein provide for continually upgrading and customizing storefront images based on continuous collection of information regarding efficacy of templates with respect to single, individual, users, or with respect to subgroups or groups of users. Such user interface improvements help to conserve computing and networking resources.

Also described herein are systems and devices comprising one or more processors and one or more memories, as well as non-transitory computer-readable media storing computer-executable instructions that, when executed by the one or more processors, cause performance of various acts and/or processes disclosed herein. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a composite storefront image management system 102 is utilized to manage composite virtual storefront images (or "composite storefront images"). The composite storefront image management system 102 (e.g., a composite virtual storefront image management system) can manage the composite storefront images based on media content, historical artwork styles, media content frames, and object bounding boxes.

The composite storefront image management system 102 can include one or more processors 104 and computer-readable media 106. The computer-readable media 106 can be utilized to store one or more machine learning (ML) model components 108. The ML model component(s) 108 can include a style selection (or "discovery") component 110, a frame discovery (or "selection") component 112, a foreground selection component 114, and/or a composite image orchestration component 116. The composite storefront image management system 102 can store information in one or more databases, including a media content database 118, a historical images database (or "historical storefront images database") 120, a style information database 122, a frames database 124, a foregrounds database 126, and/or a composite images database 128.

The ML model component(s) 108 can operate, and/or be utilized or processed, based on one or more existing (or "historical") images associated with media content, such as videos, trailers, etc. (e.g., media content stored in the media content database 118). In some examples, a trailer can be an abbreviated or shorted version of the video, to be utilized, for example, for promotional or informational purposes. The historical image(s) can include various types of images (e.g., artwork images (or "artwork")), including one or more manually created storefront images and one or more single frame based storefront images associated with the media content. The manually created storefront image(s) may be created by users (e.g., artists, graphic designers, etc.) as representations of the media content. The single frame based storefront image generation may include the single based image(s) being generated by selection and extraction of single frames from the media content and utilization of the single frames as the single frame based storefront images. Single based frame storefront images generation may include fully-manual generation, partially manual and/or partially automated generation, or fully automated generation. In some examples, semi-automatic single frame based storefront image selection may be performed as a human-in-the-loop process (e.g., one or more manually selected single frames may be identified and/or selected to be utilized instead of one or more single frames selected via one or more automated processes). The historical image(s) and/or the historical image information may be stored in the historical images database 120.

The templates can be generated based on historical image clusters associated with sets of the historical images. The sets of the historical images can be generated as the historical image clusters based on similarities between the historical images in the sets being greater than or equal to threshold similarities.

The style selection component 110 can be utilized to select one or more video artwork styles (or "style(s)"), and/or to manage video artwork style information (or "style information"). The style(s) can be selected utilizing templates associated with one or more historical storefront images (or "historical image(s)") associated with one or more existing media content items (e.g., existing video(s), existing trailer(s), etc.). The video artwork style information can include information of various types associated with the video artwork style(s). In some examples, the video artwork style information can include one or more of style identifiers, style descriptions, style characteristics, style creation dates, style attributes, etc. The style(s) and/or the style information can be stored in the styles database 122.

The style selection component 110 can select the style(s) and/or one or more style attributes associated with the style(s) based on one or more frame attribute similarities and one or more media content attribute similarities. In some examples, the style(s) can be selected based on frame attribute similarity (ies) between one or more trained frame attributes (e.g., trained frame attribute(s) associated with one or more trained frames of trained media content associated with the historical storefront image, which can be identified based on ML model training) and one or more frame attributes of one or more frames of the media content being greater than or equal to a threshold frame attribute similarity. In those or other examples, the style(s) can be selected based on the media content attribute similarity (ies) between one or more trained media content attributes (e.g., trained media content attribute(s) associated with the trained (e.g., existing) media content associated with the historical storefront image, which can be identified based on ML model training) and one or more media content attributes of the media content being greater than or equal to one or more threshold media content attribute similarities.

The trained frame attribute(s) can be identified by operator selections from among selection frame attribute(s) (e.g., previously identified frame attribute(s) associated with the frame(s) of the trained media content associated with the historical storefront image), via the ML model training. The trained media content attribute(s) can be identified by operator selections from among selection media content attribute(s) (e.g., previously identified media content attribute(s) associated with the trained media content associated with the historical storefront image).

As a hypothetical example, styles can be selected based on existing styles that are identified as being appropriate for accurately, entertainingly, and selectively, representing a movie, show, or trailer. The existing styles can be identified based on artwork being manually generated previously by designers of movie studios or graphic design companies. An ML model having been trained to identify styles can search through clusters of existing artwork and select an appropriate cluster, such as a cluster of a similar genre and/or with similar events occurring in the movie. Alternatively or additionally, such as, for instance with the media content being a show (e.g., television or streaming program other than a movie) instead of a movie, an episode of the show, and/or any information related to the episode, can be utilized in a similar way as for the movie (e.g., composite images can be created for shows, or for one or more episodes of one or more shows, or any other portions of the episodes and/or the shows, and/or any portions of movies, etc.). A cluster (e.g., a cluster of historical artwork with similarities between one another) might portray, for example, different items of artwork that each have a group of actors standing on a rooftop or other structure, with vehicles flying around in the background. The cluster can include artwork that is related via one or more similar semantic attributes associated with the movie, such as one or more similar subgenres, one or more similar title level attributes (one or more similar mood attributes, character types, primary filming locations, etc.), one or more similar synopses, one or more similar summaries, one or more similar plot keywords, one or more similar screenplays, etc.

In some examples, a template being generated by the ML model based on the cluster can be identified, alternatively or additionally to identifying and/or generating the cluster. The template can include an outline of where the object(s) (e.g., foreground object(s)) are located. One or more filtering styles can be associated with one or more filters to be applied to generate the composite image(s). By way of example, the filtering style(s) can include one or more painting styles, one or more rainy styles, or one or more sand styles, which can be utilized by applying the filter(s) on the composite image. By integrating the style(s) and/or template(s), with the filtering style(s), the cluster(s) can be identified based on the style(s) and/or template(s), as well as the filtering style(s).

In some examples, utilizing the style(s) and/or template(s) can occur separately from utilization of the filtering style(s), to identify the cluster(s). The ML model(s) can be trained in a supervised manner for utilizing, individually or in combination, the style(s) and/or template(s), as well as the filtering style(s), on historical artwork styles and historical artwork style metadata. In some examples, for instance with the style(s) and/or template(s) being utilized separately from the filtering style(s), the ML model(s) can be trained to identify one or more style selections, based on the style(s) and/or template(s), to avoid having to label the historical artwork with styles manually (e.g., the ML mode(s) can be trained with synthetically created style datasets).

In the hypothetical example, the template or the cluster can be selected as including artwork with similar objects and/or backgrounds as in the video for which a composite image is currently being generated. Additionally or alternatively, the template or cluster can also be selected based on attributes of the cluster or videos associated with artwork in the cluster. Additionally or alternatively, the template or cluster can be selected based on the associated videos being categorized in the action genre and based on the genre of the currently analyzed video being action. Additionally or alternatively, the template or cluster can be selected based on the associated videos and the currently analyzed video both including rooftop scenes, flying vehicle scenes, war scenes, etc. Additionally or alternatively, the template or cluster can be selected based on the associated videos and the currently analyzed video both including similar actors, similar crew members, such as directors, etc.

In the hypothetical example, the template or cluster can, additionally or alternatively, be selected based on the associated videos and the currently analyzed video both including patterns between groups of frames. The patterns can include one or more unique patterns that are shared by the videos and analyzed video, such as live action transitioning to animation, or vice versa, color schemes changing (e.g., black and white changing to color, or vice versa), color tones changing (e.g., warm colors changing to cool colors, or vice versa, vibrant and radiant colors changing to drab and somber colors, or vice versa, etc.), and so on.

In the hypothetical example, the template or cluster can, additionally or alternatively, be selected based on user information associated with a user to which the composite image for the currently analyzed video is to be shown. The user information can include demographic of the user, such as an age range, a race or ethnicity, a nationality, a religion, a philosophy, a family status or history, an income or economic status, a political affiliation, an occupation, a sexual orientation or identity, a pastime, or a social sphere. Additionally or alternatively, the user information can include a proclivity or a preference of the user, based on viewing history, to watch similar types of movies (e.g., movies of the same genre, with the same actors or crew members, etc.). Additionally or alternatively, the user information can include a proclivity or a preference of the user, based on viewing history, to watch movies with similar cover art to the template or the cluster. Additionally or alternatively, the user information can include a time of day and/or a day of a week at which the composite image is to be generated and/or presented to the user. Additionally or alternatively, the user information can include user device information, such as device identifies, network identifiers, device makes and/or models, device locations, device types, etc.

The frame discovery component 112 can be utilized to select one or more frames (or "fragment(s)") and/or to manage frame information (or "frame selection information"). The frame(s) can be selected utilizing the selected style(s), based on the media content. The frame information can include information of various types associated with the frame(s). In some examples, the frame information can include one or more of frame identifiers, frame descriptions, frame characteristics, frame creation dates, frame attributes, etc. The frame discovery component 112, being trained, can be utilized to identify one or more of the frame(s) (e.g., a single frame) (e.g., more than one frame) based on one or more candidate attributes. The candidate attribute(s) can be identified based on one or more similarities of the candidate attribute(s) and one or more other attributes (e.g., one or more trained attributes) identified during ML model training, based on the similarity(ies) between the candidate attribute(s) and the trained attribute(s) being greater than or equal to one or more threshold similarity(ies). The frame(s) and/or the frame information can be stored in the frames database 124. The frame attribute(s) can be characteristic and/or descriptive of individual ones of amalgamated subsets of the frame(s).

In some examples, the frame discovery component 112 can identify the frame(s) based on one or more frame extraction filters. The frame extraction filter(s) can extract the frame(s) based on relevance of the frame(s) to media content title(s), and/or quality of the frame(s), etc. Relevance of the frame(s) can be identified by the attributes of the frame (e.g., one or more actors, one or more objects, one or more activities, etc.) to the media content and/or the metadata (e.g., one or more synopses, one or more genres, one or more actors, etc.). Quality of the frame(s) can be identified by blurriness, excessive crops of actors, objects, brightness, etc.

As a hypothetical example, frames of a video for which cover art is being generated can be selected based on the frames having content that matches portions of a template. A frame with an object suitable for a position of the template to which the object is to be placed can be selected. Various objects can be extracted from that frame or other frames. After all of the objects are extracted, a composite image can be generated by placing all of the objects in positions in the template. Object placement can include characters, buildings, and landscape objects, such as trees or hills. Object placement can include fitting a background to the composite image, as well as a logo. The foreground (e.g., object) (or "foreground section"), background (or "background section"), and/or logo (or "logo section") can be extracted from a frame of the video or any other relevant information, such as promotional materials and/or any video or image files with logos.

The foreground detection component 114 can be utilized to identify, detect, select, and/or generate one or more foregrounds, the foreground(s) including foreground information, one or more objects, object information, one or more bounding boxes, and/or bounding box information. Alternatively or additionally, foreground detection can be utilized to manage, separately or in combination with the foreground(s), the foreground information, the object information, and/the or bounding box information. The bounding box(es), which can be associated with one or more objects, can be selected utilizing the selected style(s), based on the selected frame(s). The bounding boxes can be selected by utilizing objection detection models (e.g., end-to-end object detection with transformers (DETR) models, region based convolutional neural network (RCNN) detection models, Faster-RCNN models, you only look once (YOLO) detection models, etc.), and/or one or more other processes of various types capable of bounding box detection/extraction.

The object(s) can be identified and/or selected by an object selection subcomponent in the foreground detection component 114 and/or a separate object selection component (e.g., the matting 220, or a subcomponent of the matting 220, as discussed below with reference to FIG. 2) of the ML model component(s) 108. The object(s) can include human characters (e.g., humans) (or "characters"), non-human characters (or "animals"), and non-characters (e.g., non-human objects). The non-human objects can include any other types of objects, including buildings, vehicles (e.g., cars, planes, boats, motorcycles, bicycles, etc.), environmental objects, infrastructure objects (e.g., roads, signs, pipes, sidewalks, etc.). The bounding box information can include information of various types associated with the bounding box(es). The foregrounds, including foreground information, object(s), object information, bounding box(es), and/or the bounding box information can be stored in the foregrounds database 126. Identifying and/or selecting the foreground(s) and/or the bounding box(es) can be utilized to identify the object(s), and/or to estimate and/or determine aspects, such as a size, a location, a shape, colors, etc. of the object(s).

In some examples, the bounding box information can include one or more of bounding box identifiers, bounding box descriptions, bounding box sizes, bounding box locations, bounding box characteristics, bounding box creation dates, bounding box attributes, etc. By way of example, the bounding box information can include the bounding box position at an x-coordinate of a pixel of a bounding box corner (e.g., an upper left corner) and a y-coordinate of the pixel of the bounding box corner (e.g., the upper left corner). In such an example, the bounding box information can include the bounding box size as a width (e.g., a number of pixels across, measured from the upper left corner and to a right side of the bounding box) and a height (e.g., a number of pixels down, measured from the upper left corner to a lower side of the bounding box).

As a hypothetical example, bounding boxes can be generated based on objects in frames of videos and utilized to generate composite images. The bounding boxes can be square or rectangular shaped, or any other shape, such as other types of conventional mathematical shapes, or custom fit shapes loosely (with a buffer) or exactly outlining the objects. The bounding boxes can be utilized to track information about the objects, such as types of objects, actor names, characteristics (e.g., information associated with quality of how well the object is portrayed), frame numbers, time information (e.g., time stamps), locations of the objects in the frames, object scaling, object rotation, object orientation, and/or any other type of information. The bounding boxes can be stored and managed along with the bounding box information, or vice versa.

The composite image orchestration component 116 can be utilized to orchestrate one or more composite virtual storefront images (or "composite storefront images") and/or to manage composite virtual storefront image information (or "composite storefront image information"). The composite storefront image(s) can be orchestrated utilizing the selected frame(s) and/or the selected bounding box(es) based on the selected style(s). The composite storefront image information can include information of various types associated with the composite storefront image(s). In some examples, the composite storefront image information can include one or more of composite storefront image identifiers, composite storefront image descriptions, composite storefront image characteristics, composite storefront image creation dates, composite storefront image attributes, etc. The composite image(s) and/or the composite image information can be stored in the composite images database 128.

As a hypothetical example, the composite images can be generated by assembling collected information such as objects, backgrounds, and logos into preliminary, course composite images. The course composite images can have the objects, backgrounds, and logos, in relatively accurate locations of template. The course composite images can be refined using the templates and/or the artwork used as samples for the composite images. The composite images can be presented to users as representations of the videos or other types of media content.

One or more of the ML model component(s) 108 can be trained utilizing training metadata and the historical storefront images. The training metadata, which can be associated with historical videos associated with the historical storefront images, can include similar data as in the metadata 204, as discussed below with reference to FIG. 2.

The style selection component 110 can be trained to be utilized to select the style(s). In some examples, training of the style selection component 110 can include identifying one or more training styles as one or more trained styles based on one or more the historical storefront images. One or more groups of the training style(s), which can be included as part of one or more training components utilized to train the ML model and/or one or more of the ML model component(s) 108, can be identified as one or more trained sets of styles based on similarities between the grouped training style(s) being greater than or equal to threshold similarities. The training components can include metadata (or "training metadata") (e.g., training title names, training title attributes, training plot keywords, training synopses, training genres, etc.), which can be data utilized to train the ML model component(s) 108, and which can be similar as, or can include, some or all of the metadata 204. Style selection training can be performed via one or more supervised model that takes input (e.g., the media content 202, the metadata 204, one or more artwork templates, etc.), in order to output the training artwork style(s) as training examples.

The training set(s) of styles can be utilized to identify one or more trained sets of styles based on the historical image cluster(s) (or "training clusters"). The training cluster(s), which can include the training sets of style(s), can be generated based on one or more of various types of clustering algorithms (e.g., K-means clustering algorithms, density-based spatial clustering of applications with noise (DB-SCAN) clustering algorithms, gaussian mixture model clustering algorithms, balance iterative reducing and clustering using hierarchies (BIRCH) clustering algorithms, affinity propagation clustering algorithms, mean-shift clustering algorithms, ordering points to identify the clustering structure (OPTICS) clustering algorithms, agglomerative hierarchy clustering algorithms, etc.). One or more training clusters can be included as part of the training component(s), can be identified as, and/or utilized to generate, one or more training templates, which can be utilized to select the style(s) and generate one or more trained templates, as discussed above. The trained template(s) can be included as part of the trained component(s).

The style selection component 110 can be trained by identifying one or more training attributes (e.g., training style attribute(s)) from among a subset of style selection attributes in a list of style selection attributes. The training style attribute(s) can be utilized to identify one or more trained style attributes and/or trained style information based on operator selections confirming accuracy of the subset of style selection attributes via operator input received by a user interface presented via an operator device. The accuracy of the subset of style selection attributes being confirmed can indicate that the style selection attributes accurately match, represent, and/or describe the training style. Trained style information, which can be identified based on the ML model training, can include style attribute identifiers associated with the training style attributes. The training style information can include style identifiers associated with training frames in which the training style discovery attributes are identified.

The trained style(s) can be utilized and/or managed as separate and different from trained template(s). The trained style(s), which can include generalized information associated with the trained template(s), can be utilized as guidelines for style selection. The generalized information can include abbreviated and/or unique characteristics, descriptions, summaries of types and/or locations of objects, bounding boxes, foregrounds, backgrounds, etc. In comparison, the trained template(s) can include additional information such as additional details not included in the style(s) related to exact locations, sizes, characteristics, etc., of objects, bounding boxes, foregrounds, backgrounds, etc., included in trained storefront images (e.g., existing storefront images) with which the trained template(s) are associated.

Although, the trained style(s) and/or the trained set(s) of styles can be managed as separate and different component from the trained template(s), as discussed above in the current disclosure, it is not limited as such. In some examples, the trained style(s) and/or the trained set(s) of styles can be utilized and/or managed as being similar or identical to the trained template(s). In those examples, any of the trained style(s), the trained set(s) of styles, and/or the trained template(s) can be utilized to implement any techniques associated with any of the trained style(s), the trained set(s) of styles, and/or the trained template(s), as discussed herein.

The frame discovery component 112 can be utilized to select the frame(s), as discussed above, based on the frame discovery component 112 being trained. In some examples, training of the frame discovery component 112 can include identifying one or more of training frames of the media content as one or more trained frames, based on the training style(s). The trained frame(s) can be included as part of the trained component(s).

The frame discovery component 112 can be trained by utilizing one or more training frames, one or more training attributes (e.g., training frame discovery attributes) from among a subset of frame discovery selection attributes in a list of frame discovery selection attributes, and/or training frame information, to identify trained frames, one or more trained frame attributes, and/or one or more trained frame information. The trained frame discovery attribute(s) can be identified based on operator selections confirming accuracy of the subset of selection attributes via operator input received by a user interface presented via the operator device. The input identifying individual ones of the subset of frame selection attribute(s) may indicate that the frame selection attribute(s) accurately match, represent, and/or describe the training frame. The training frame information can include one or more training frame discovery attribute identifiers associated with the training frame discovery attributes. The training attribute information can include one or more frame identifier(s) associated with the training frame(s) in which the training frame discovery attributes are identified.

The foreground detection component 114 can be trained to be utilized to detect the foreground(s), to select and/or generate the bounding box(es) (e.g., individual bounding box(es) associated with the respective foreground(s)) associated with the foreground(s), and/or to select and/or generate one or more matting models (e.g., individual matting model(s) associated with the respective foreground(s)) associated with the foreground(s). In some examples, training of the foreground detection component 114 can include utilizing one or more training bounding boxes of the training frame(s), based on the training style(s) and/or the trained style(s), to identify one or more trained bounding boxes. The trained bounding box(es), which can be included as part of the trained component(s), can be utilized to select the bounding box(es), as discussed above.

The foreground detection component 114 can be trained by identifying training attributes (e.g., training bounding box attributes) from among a subset of bounding box selection attributes in a list of bounding box selection attributes. One or more training bounding boxes, the training bounding box attributes, and/or training bounding box information can be utilized to identify one or more trained bounding boxes, one or more trained bounding box attributes, and/or trained bounding box information. The trained bounding box attributes in the subset can be identified based on operator selections confirming accuracy of the subset of bounding box selection attributes via operator input associated with the list of bounding box selection attributes, the operator input being received by a user interface presented via the operator device. The input identifying individual ones of the subset of bounding box selection attribute(s) may indicate that the bounding box selection attribute(s) accurately match, represent, and/or describe the training object with which the training bounding box is associated. The training bounding box information can include bounding box attribute identifiers associated with the bounding box training attributes. The training bounding box information can include bounding box identifiers associated with training bounding boxes in which the training bounding box attributes are identified.

The composite image orchestration component 116 can be trained to be utilized to orchestrate artwork to generate one or more composite images. In some examples, training of the composite image orchestration component 116 can include identifying one or more training composite images, based on the training style(s). The training composite images, which can be included as part of the training component(s), can be utilized to identify trained composite images to orchestrate the composite images, as discussed above.

The composite image orchestration component 116 can be trained by utilizing training attributes (e.g., training composite image attributes) from among a subset of composite image selection attributes in a list of composite image selection attributes. One or more training composite images, the training composite image attributes, and/or training composite image information can be utilized to identify one or more trained composite images, one or more trained composite image attributes, and/or trained composite image information. The trained composite image attributes can be identified based on operator selections confirming accuracy of the subset of composite image selection attributes via operator input received by a user interface presented via the operator device. The input identifying individual ones of the subset of composite image selection attribute(s) may indicate that the composite image selection attribute(s) accurately match, represent, and/or describe a composite image. The training attribute information can include composite image attribute identifiers associated with the training composite image attributes. The training attribute information can include composite image identifiers associated with training composite images in which the training composite image attributes are identified.

In some examples, identification or selection of the training style(s), the training cluster(s), the training template(s), the training frame(s), and/or the training bounding box(es) can be manually performed by operators. However, the current disclosure is not limited as such. In some examples, identification or selection of the training style(s), the training cluster(s), the training template(s), the training frame(s), and/or the training bounding box(es) can be at least partially automated and/or performed utilizing computing devices in various ways.

One or more communications can be exchanged between the composite storefront image management system 102, the third-party server(s) 130, and/or the user device(s) 136. The communication(s) exchanged between the composite storefront image management system 102 and the third-party server(s) 130 can include one or more media content communications 132 exchanged between the composite storefront image management system 102 and the third-party server(s) 130. The media content communication(s) 132 can include one or more messages (or "media content request(s)") transmitted by the composite storefront image management system 102, to request one or more media content items (or "requested media content") and/or media content information (e.g., information including the metadata 204 as discussed below with reference to FIG. 2, and/or one or more other types of media content information). The media content request(s) transmitted by the composite storefront image management system 102 can include request information associated with requested media content and/or requested media content information. The request information can identify the requested media content and/or the requested media content information. The requested media content information can include one or more of media content identifiers, media content descriptions, media content characteristics, media content creation dates, media content attributes, etc., associated with the requested media content and/or other media content (e.g., previously received media content).

The media content communication(s) 132 can include one or more messages (or "third-party media content message(s)") transmitted by the third-party server(s) 130 and received by the composite storefront image management system 102. The third-party media content message(s) can include one or more requested media content items and/or one or more portions of requested media content information.

The media content communication(s) 132 can include one or more messages (or "media content responses") transmitted by the composite storefront image management system 102 in response to received message(s). The media content response(s) transmitted by the composite storefront image management system 102 can include response information associated with the requested media content, received media content (e.g., media content being retrieved from the third-party database(s) 120 and by the third party server(s) 130, and being transmitted by the third party server(s) 130, and being received by the composite storefront image management system 102), unreceived media content, the requested media content information, received media content information (e.g., media content information being retrieved, transmitted, and received in a similar way as the received media content), and/or unreceived media content information. The response information can confirm successful receipt of one or more media content items (or "received media content") and/or one or more portions of requested media content information, and/or indicating unsuccessful receipt of one or more requested media content item(s) and/or one or more portions of requested media content information.

The communication(s) exchanged between the composite storefront image management system 102 and the third-party server(s) 130 can include one or more storefront image communications 134 exchanged between the composite storefront image management system 102 and the third-party server(s) 130. The storefront image communication(s) 134 can include one or more messages (or "storefront image request(s)") transmitted by the composite storefront image management system 102, to request one or more storefront images (or "requested storefront image(s)") and/or storefront image information. The storefront image request(s) transmitted by the composite storefront image management system 102 can include request information associated with requested storefront image(s) and/or the requested storefront image information. The request information can identify the requested storefront image(s) and/or the requested storefront image information, and/or information identifying the requested storefront image(s) and/or the requested storefront image information associated with the requested storefront image(s) and/or with previously received storefront image(s). The requested storefront image information can include one or more of storefront image identifiers, storefront image descriptions, storefront image characteristics, storefront image creation dates, storefront image attributes, etc., associated with the requested storefront image(s) and/or other storefront image(s) content (e.g., previously received storefront image(s)).

The storefront image communication(s) 134 can include one or more messages (or "third-party storefront image message(s)") transmitted by the third-party server(s) 130 and received by the composite storefront image management system 102. The third-party storefront image message(s) can include one or more requested storefront image(s) and/or one or more portions of requested storefront image information.

The storefront image communication(s) 134 can include one or more messages (or "storefront image responses") transmitted by the composite storefront image management system 102 in response to received storefront image(s). The storefront image response(s) transmitted by the composite storefront image management system 102 can include response information associated with the requested storefront image(s), received storefront image(s) (e.g., storefront image(s) being retrieved from the third-party database(s) 120 and by the third party server(s) 130, and being transmitted by the third party server(s) 130, and being received by the composite storefront image management system 102), unreceived storefront image(s), the requested storefront image information, received storefront image information (e.g., storefront image information being retrieved, transmitted, and received in a similar way as the received storefront image(s)), and/or unreceived storefront image information. The response information can confirm successful receipt of one or more requested storefront image(s) and/or one or more portions of requested storefront image information, and/or indicating unsuccessful receipt of one or more requested storefront image(s) and/or one or more portions of requested storefront image information.

The communication(s) exchanged between the composite storefront image management system 102 and the user device(s) 136 can include one or more media content communications 138. The media content communication(s) 138 can include one or more messages (or "media content request(s)") (e.g., streaming and/or downloading request(s)) transmitted by the user device(s) 136, to request one or more media content items (or "requested media content") and/or media content information (e.g., information including the metadata 204 as discussed below with reference to FIG. 2, and/or one or more other types of media content information). The media content request(s) transmitted by the user device(s) 136 can include request information associated with requested media content and/or requested media content information. The request information can identify the requested media content and/or the requested media content information. The requested media content information can include one or more of media content identifiers, media content descriptions, media content characteristics, media content creation dates, media content attributes, etc., associated with the requested media content and/or other media content (e.g., previously received media content).

The media content communication(s) 138 can include one or more messages (or "media content responses") transmitted by the user device(s) 136 in response to received message(s). The media content response(s) transmitted by the user device(s) 136 can include response information associated with the requested media content, received media content, unreceived media content, the requested media content information, received media content information, and/or unreceived media content information. The response information can confirm successful receipt (e.g., initiating of streaming and/or downloading, completion of a partial portion or an entire portion of streaming and/or downloading, etc.) of one or more portions of one or more media content items (or "received media content") and/or one or more portions of requested media content information, and/or indicating unsuccessful receipt of one or more requested media content item(s) and/or one or more portions of requested media content information.

The media content communication(s) 132 can include one or more messages (or "service provider media content message(s)") transmitted by the composite storefront image management system 102 and received by the user device(s) 136. The service provider media content message(s) can include one or more portions of one or more requested media content items and/or one or more portions of requested media content information. The one or more portions of one or more requested media content items can be transmitted by the composite storefront image management system 102 and received by the user device(s) 136, via streaming, downloading, etc.

The communication(s) exchanged between the composite storefront image management system 102 and the user device(s) 136 can include one or more composite virtual storefront image communications (or "composite storefront image communication(s)") 140. The composite storefront image communication(s) 140 can include one or more messages (or "storefront image request(s)") transmitted by the user device(s) 136, to request one or more composite storefront images (or "requested composite storefront image(s)") and/or composite storefront image information. The composite storefront image request(s) transmitted by the user device(s) 136 can include request information associated with requested composite storefront image(s) and/or the requested composite storefront image information. The request information can identify the requested composite storefront image(s) and/or the requested composite storefront image information, and/or information identifying the requested composite storefront image(s) and/or the requested composite storefront image information associated with the requested composite storefront image(s) and/or with previously received composite storefront image(s). The requested composite storefront image information can include one or more of composite storefront image identifiers, composite storefront image descriptions, composite storefront image characteristics, composite storefront image creation dates, composite storefront image attributes, etc., associated with the requested composite storefront image(s) and/or other composite storefront image(s) content (e.g., previously received composite storefront image(s)).

The composite storefront image communication(s) 140 can include one or more messages (or "storefront image responses") transmitted by the user device(s) 136 in response to received composite storefront image(s). The storefront image response(s) transmitted by the user device(s) 136 can include response information associated with the requested composite storefront image(s), received composite storefront image(s), unreceived composite storefront image(s), the requested composite storefront image information, received composite storefront image information, and/or unreceived composite storefront image information. The response information can confirm successful receipt of one or more requested composite storefront image(s) and/or one or more portions of requested composite storefront image information, and/or indicating unsuccessful receipt of one or more requested composite storefront image(s) and/or one or more portions of requested composite storefront image information.

The composite storefront image communication(s) 140 can include one or more messages (e.g., service provider composite virtual storefront image message(s)) (or "service provider composite storefront image message(s)") transmitted by the composite storefront image management system 102 and received by the user device(s) 136. The service provider composite storefront image message(s) can include one or more requested composite storefront image(s) and/or one or more portions of requested composite storefront image information.

Although one or more components, including the style selection component 110, the frame discovery component 112, the foreground detection component 114, and/or the storefront image orchestration component 116 can be ML model component(s) as discussed above in this disclosure, it is not limited as such. Any of the style selection component 110, the frame discovery component 112, the foreground detection component 114, the storefront image orchestration component 116, and/or one or more other components (e.g., one or more of any other components discussed herein) can be implemented utilizing a single ML model or more than one ML model for purposes of performing any of the techniques discussed throughout the current disclosure. Alternatively or additionally, any of the style selection component 110, the frame discovery component 112, the foreground detection component 114, the storefront image orchestration component 116, and/or one or more other components (e.g., one or more of any other components discussed herein) can be implemented utilizing one or more same, or different, ML model(s) as any of the others for purposes of performing any of the techniques discussed throughout the current disclosure. Alternatively or additionally, any of the style selection component 110, the frame discovery component 112, the foreground detection component 114, the storefront image orchestration component 116, and/or one or more other components (e.g., one or more of any other components discussed herein) can be implemented without utilizing any ML model for purposes of performing any of the techniques discussed throughout the current disclosure.

The object analysis information, which can be utilized to determine the media content portions to be extracted from the media content, can include style selection information (e.g., any information managed by the style selection 110), frame discovery information (e.g., any information managed by the frame discovery 112), matting information (e.g., any information managed by the foreground detection 114 and/or a matting component), and/or composite image orchestration information (e.g., any information managed by the composite image orchestration information 116). The style selection information can include selected existing storefront image identifiers associated with the sets of existing storefront images to be utilized as the templates of artwork styles for generation of the composite storefront image. The frame discovery information can include frame identifiers associated with frames selected from the media content to be analyzed for determination of the media content portions to be extracted. The matting information can include foreground portion identifiers and background portion identifiers, the foreground portion identifiers being associated with foreground portions including the media content portions to be extracted. The matting information can further include media content portion identifiers associated with the media content portions to be extracted.

Although the training component(s) can be utilized to train the ML model and/or one or more of the ML model component(s) 108, as discussed above in the current disclosure, it is not limited as such. One or more portions of training information can be managed and utilized, individually or in combination with, the training component(s) in a similar way as discussed throughout the current disclosure, to implement any techniques discussed herein. The training information, which can be generated and/or identified as part of generation and/or management of the training component(s), can include similar types of information as in the media content information, and/or any other information utilized for generation of the composite storefront image(s) as discussed throughout the current disclosure.

Although the term "storefront" is utilized with respect to various "composite image(s)" related features, such as "composite storefront image(s)," as discussed throughout the current disclosure, it is not limited as such. In some examples, any other types of "composite image(s)," such as "composite cover-art images," being usable for similar and/or other purposes, such as for "storefronts," "cover-art," and/or any other purposes, can be implemented in a similar way as for "composite storefront image(s)," and utilized according to any of the techniques discussed herein.

Although the term "storefront" is utilized with respect to various "image(s)" related features, such as "storefront image(s)" (e.g., non-composite "storefront image(s)"), as discussed throughout the current disclosure, it is not limited as such. In some examples, language referring to "storefront image(s)" (e.g., non-composite "storefront image(s)") can be interpreted instead as referring to any other types of "image(s)" (e.g., non-composite "image(s)"), such as non-composite "cover-art image(s)," being usable for similar and/or other purposes, such as for "storefronts," "cover-art," and/or any other purposes, according to any of the techniques discussed herein.

Figure 2:
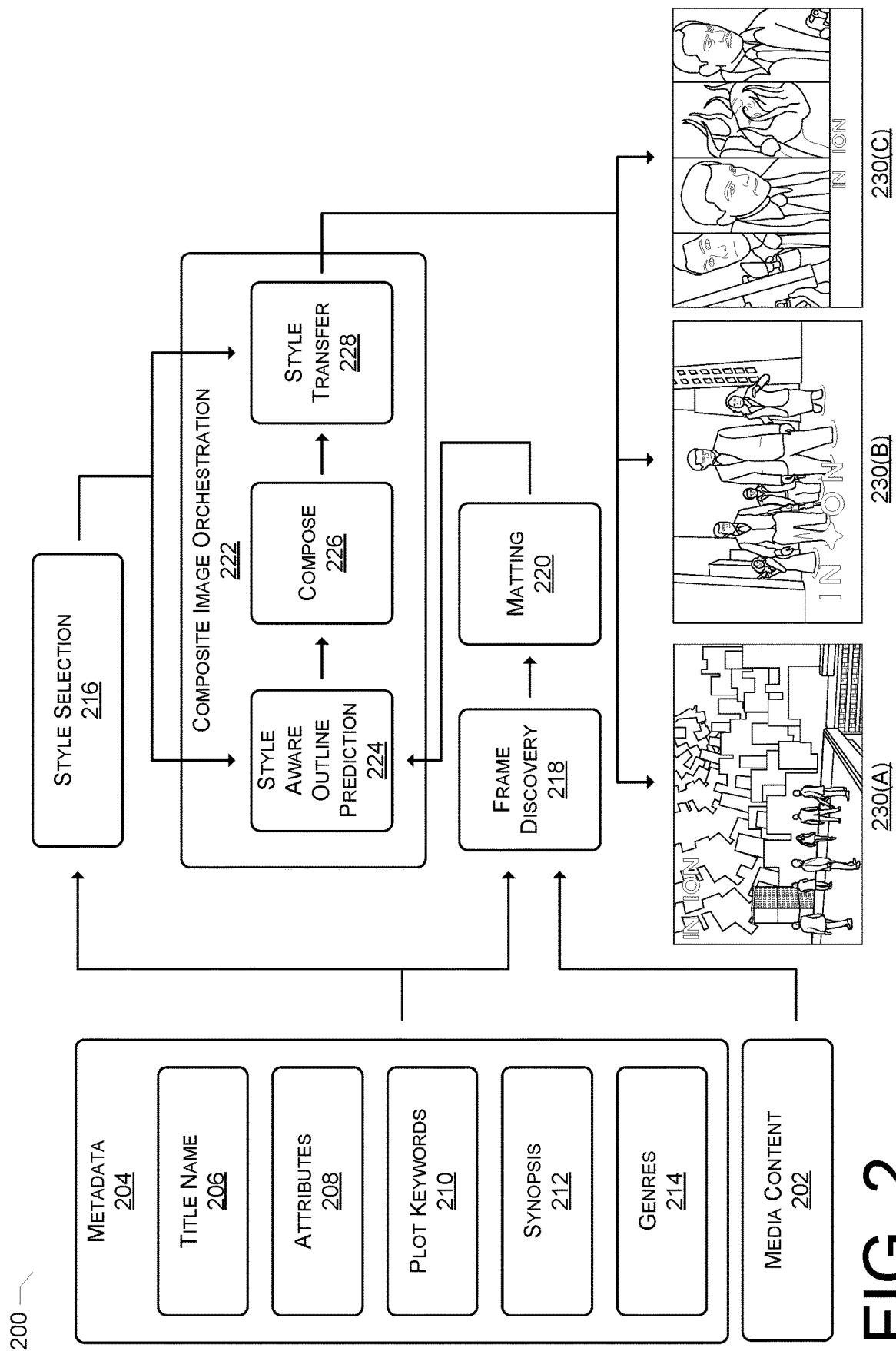
FIG. 2 illustrates a component diagram of example components in a composite storefront image management system utilized to manage composite storefront images.

FIG. 2 illustrates a component diagram of example components 200 in a composite storefront image management system utilized to manage composite storefront images. In some examples, the components 200, which can be utilized to implement the composite storefront image management system 102 as discussed above with reference to FIG. 1, can include one or more of a media content component (or "media content") 202, and a metadata component (or "metadata") 204 associated with the media content 202 (e.g., a video, a trailer associated with the video, etc.). The media content 202 can include one or more files including, individually or in any of various combinations, one or more of video data (or "video"), dialog data (or "dialog"), subtitles data (or "subtitles"), etc.

The metadata 204 can include one or more subcomponents (or "metadata subcomponent(s)") associated with the media content 202, the metadata subcomponent(s) including a title name subcomponent (e.g., a subcomponent with one or more title names) (or "title name(s)") 206, an attribute subcomponent (e.g., a subcomponent with one or more attributes) (or "attribute(s)") 208, a plot keyword subcomponent (e.g., a subcomponent with one or more plot keywords) (or "plot keyword(s)") 210, a synopses subcomponent (e.g., a subcomponent with one or more synopses) (or "synopsis(es)") 212, and/or a genre subcomponent (e.g., a subcomponent with one or more genres) (or "genre(s)") 214.

The metadata subcomponent(s) can include various types of information associated with the media content 202. The title name(s) 206 can include one or more media content title names, which can be associated with one or more countries and/or languages. The attribute(s) 208 can include one or more media content attributes, including one or more technical attributes and/or one or more other attributes. The technical attribute(s) can include pixel dimensions, frame rates, audio channels, durations, quality levels, compression settings, file types, file sizes, audio sample rates, video data rates, etc. The other attribute(s) can include characteristics (e.g., filming locations, time periods, languages, social media and/or cultural trends information, etc.), critic and/or popular ratings, cast and/or crew members, film studios, awards, critic reviews, trivia, parents' guide ratings, quotes, goofs, soundtrack information, etc. The plot keyword(s) 210, the synopsis(es) 212, and/or the genre(s) 214 can include keyword(s) and/or synopsis(es), respectively, any of which can identified by one or more of critics, viewers, studios, service providers, etc., associated with the media content 202.

The components 200 can include a style selection component (or "style selection") 216. The style selection 216 can include one or more selections of one or more styles to be utilized to generate one or more composite virtual storefront images (or "composite storefront images") associated with the media content 202. The style selection 216, which can generate the style(s) in a similar way as for the style selection component 110, as discussed above with reference to FIG. 1, can be utilized to implement the style selection component 110. By way of example, the style selection 216 can be included in one or more machine learning (ML) models, which can be trained utilizing the training component(s) (e.g., the training style(s), the training set(s) of styles, the training cluster(s), the training template(s)) and/or the training information, as discussed above with reference to FIG. 1.

In some examples, the style selection 216 can determine and/or select the style(s) based on the metadata 204, utilizing trained style(s), trained sets of style(s), trained clusters, and/trained template(s). In those examples, for instance for a media content item (e.g., a video, a trailer, etc.) of the media content 202, the style selection 216 can identify a style based on a template, the template being identified utilizing trained templates. The template can be selected by identifying one or more of trained template(s), based on one or more similarities (e.g., similarities in information, characteristics, attributes, etc.) between trained information (e.g., trained metadata) associated with the trained template(s) and the metadata 204 being greater than or equal to threshold similarities. Alternatively or additionally, the template can be selected by identifying the one or more of the trained template(s) based on one or more similarities between trained information (e.g., trained metadata) associated with the trained template(s) and the metadata 204 being greater than or equal to one or more similarities between other trained information (e.g., other trained metadata) associated with one or more other trained template(s) and the metadata 204. The other trained metadata may be associated with less relevant and/or less similar media content to the media content 202.

In some examples, the style selection 216 can select the style based on the selected template, utilizing one or more of the trained template(s) (e.g., templates identified based on ML model training) and, alternatively or additionally, one or more other trained components (e.g., the trained cluster(s), the trained set(s) of styles, the trained style(s), the trained frame(s), the trained bounding box(es), etc., which can be identified based on ML model training). By way of example, similarities between trained metadata (e.g., metadata identified based on ML model training) associated with one or more of the other trained components and the metadata 204 being greater than or equal to threshold similarities can be utilized to select the style. Alternatively or additionally, similarities between the trained metadata associated with one or more of the other trained components and the metadata 204 being greater than or equal to between similarities between other trained metadata and the metadata 204 can be utilized to select the style. The other trained metadata may be associated with less relevant and/or less similar media content to the media content 202.

The style(s) can be utilized and/or managed as separate and different component(s) from the template(s), in a similar way as for the trained style(s). Alternatively, the style(s) can be utilized and/or managed as being similar or identical to the template(s), in a similar way as for the trained style(s).

Although the single style can be selected above and utilized to generate the composite storefront image, as discussed above in the current disclosure, it is not limited as such. Any number of styles, which can be selected as part of the style selection 216 in a similar way as for the style to generate any number of composite storefront images, can be utilized to implement any of the techniques discussed herein for generating any number of composite storefront images for the media content 202.

The components 200 can include a frame discovery component (or "frame discovery") 218. The frame discovery 218, which can select one or more frames in a similar way as for the frame discovery component 112, as discussed above with reference to FIG. 1, can be utilized to implement the frame discovery component 112. By way of example, the frame discovery 218 can select the frame(s) based on one or more trained attributes (e.g., any data in the metadata 204 identified based on ML model training). The frame(s) can be further selected based on the style(s) selected by the style selection 216. The data utilized as the trained attribute(s) can include one or more of the frame selection information utilized by the frame discovery 112, as discussed above with reference to FIG. 1. The selected frame can be determined based on the selected frame including, for example, an attribute such as a character (e.g., main character) of the video and/or a characteristic such as image sharpness level above a threshold image sharpness level.

Data (e.g., data in the metadata 204 and/or one or more other types of data) utilized as the trained attribute(s) can include characteristics (or "frame characteristics") and/or attributes (or "frame attributes") associated with the frame(s). By way of example, the frame discovery 218 can be included in one or more ML models, which can be trained utilizing the training component(s) and/or the training information, as discussed above with reference to FIG. 1. The frame(s) can be selected based on identifying the trained attribute(s) in the frame(s).

The selected frame(s) can be identified by analyzing one or more frames (or "analyzed frame(s)") of the media content 202. The analyzed frame(s) can include any number of frames, such as frames at predetermined time and/or frame intervals (e.g., 23 frames per second (fps), or any other interval, such as 1 fps, 46 fps, 92 fps, etc.) with respect to a first frame of the media content 202.

Increasing the frame interval increases a likelihood of analyzed frames with characteristics (or "frame characteristics") and/or attributes (or "frame attributes") that are redundant being analyzed, while decreasing the frame interval decreases a likelihood of analyzed frames with redundant characteristics and/or attributes being analyzed. In some examples, the attributes can include identifiers and/or information associated with objects, identifiers and/or information associated with locations, etc. depicted in the frame(s). In some examples, the characteristics can include amounts of lighting, amounts of focus quality, amounts of resolution, amounts of image sharpness, relative and/or actual sizes of depicted objects, object orientations, etc.

By increasing the frame interval, processing time may be reduced, and utilization of computing resources may be conserved. However, decreasing the frame interval increases the likelihood of frame(s) with unique characteristics and/or attributes not being analyzed and being omitted as selected frame(s). By increasing the likelihood of the frame(s) with unique characteristics and/or attributes not being selected, portions (e.g., objects, bounding boxes, etc.) of those unselected frame(s) may remain unavailable for purposes of generating the composite storefront image. The frame interval may be set as a balance between optimizing processing time/computing resources, and maintaining availability of one or more of the frame(s) with unique characteristics and/or attributes for generating the composite storefront image.

The selected frame(s) can be identified based on characteristics and/or attributes of the selected frame(s) being unique with respect to one or more other analyzed frame(s). Any analyzed frame(s) with characteristics and/or attributes that are similar and/or overlapping with other analyzed frame(s) can be selected, with the other analyzed frame(s) with similar and/or overlapping characteristics and/or attributes being unselected.

The components 200 can include a matting component (or "matting") 220. The matting 220 can be utilized to apply a foreground detection and matting prediction model on the selected frame(s), and to identify, select, and/or extract one or more objects from the selected frame(s) (e.g., each of the selected frames). The matting 220, and/or an object selection subcomponent of the matting 220, can perform object selection to select the object(s), in a similar way as for object selection as discussed above with reference to FIG. 1 (e.g., object selection being performed by the foreground detection component 114, by an object selection subcomponent of the foreground detection component 114, and/or by an object selection component). By way of example, the matting 220 and/or the object selection subcomponent can be included in one or more machine learning (ML) models, which can be trained utilizing the training component(s) (e.g., the training objects) and/or the training information, as discussed above with reference to FIG. 1. The matting 220, and/or the object selection subcomponent, can be utilized to implement the object selection of the foreground detection component 114 for purposes of performing any of the techniques as discussed throughout the current disclosure.

The foreground detection and matting prediction model can detect a foreground portion (or "foreground") (or "detected foreground") of the selected frame(s), by utilizing any of one or more foreground detection models and/or algorithms, such as sampling based matting, propagation based matting, learning based matting (e.g., deep automatic natural image matting), etc. The detected foreground can be utilized by the matting 220 to analyze the image, and to identify, select, and/or extract the object(s).

The components 200 can include a composite image orchestration component (or "composite image orchestration") 222. The composite image orchestration 222, which can generate the composite images(s) in a similar way as for the composite image orchestration 116, as discussed above with reference to FIG. 1, can be utilized to implement the composite image orchestration 116. By way of example, the composite image orchestration 222 can be included in one or more machine learning (ML) models, which can be trained utilizing the training component(s) (e.g., e.g., the training style(s), the trained set(s) of styles, the training cluster(s), the training template(s)) and/or the training information, as discussed above with reference to FIG. 1.

The composite image orchestration 222 can include a style aware outline prediction component (or "style aware outline prediction") 224, a compose component (or "compose") 226, and/or a style transfer component (or "style transfer") 228. One or more of the style aware outline prediction 224, the compose 226, and/or the style transfer 228 can be included in one or more ML models, which can be trained in a similar way as discussed above for the composite image orchestration 222.

The style aware outline prediction 224 can be utilized to identify, select, and/or manage one or more bounding boxes (e.g., object bounding box(es) and/or logo bounding box(es)) associated with the frame(s). The object bounding box(es) can be associated with the object(s). The logo bounding box(es) can be associated with title logos (e.g., logos depicting one or more titles of the media content 202) (or "logo(s)"). The logos can be generated by, and/or received from, service provider content associated with the composite storefront image management system 102, third-party content associated with the third party server(s) 130, and/or any other type of content associated with any other device, server, and/or system. The frame(s) (e.g., each of the frames) can be analyzed to identify the bounding box(es), which can be associated with object(s) in the frame(s). Identification of the bounding box(es) can be performed by predicting one or more bounding box locations associate with the bounding box(es). The bounding box(es) can be identified based on output (e.g., the selected style) of the style selection 216.

The style aware outline prediction 224 can be utilized to identify, select, and/or manage bounding box information associated with the bounding box(es). The bounding box information can include object bounding box information associated with the object(s) and logo bounding box information associated with the title logo(s). The frame(s) (e.g., each of the frames) can be analyzed to identify the bounding box information. The logo bounding box information can include various types of information, including the bounding box location(s), one or more color(s), one or more sizes, one or more fonts, one or more orientations, etc., associated with the title logo(s). The bounding box information can be identified based on output (e.g., the selected style) of the style selection 216.

The bounding box location(s) can be predicted based on one or more detected foregrounds of the frame(s). The style aware outline prediction 224 can be utilized to identify, select, and/or manage one or more foregrounds associate with the frame(s). The frame(s) (e.g., each of the frames) can be analyzed to identify the foreground(s). The bounding box location(s) can be predicted based on the detected foreground(s) along with one or more overlay orders and one or more weights for one or more alpha matts associated with the foreground(s) to mimic the selected style (e.g., a target style) identified by the style selection 216. The weight(s) can be utilized to identify one or more scores defining one or more transparency levels associated with one or more pixels of the frames.

The overlay order(s) can include one or more orders for adding each of the object(s) to the composite image(s) based on the alpha matt(s), for cases in which there are overlaps between the bounding box(es), which may affect a final result of the composite image(s). The overlay order(s) can be identified based on information identifying characteristics (e.g., sizes, colors, shapes, other physical aspects, etc.) associated with the foreground(s), which can be identified based on the selected style. The weight(s) utilized to determine the overlay order(s) can include information identifying levels of transparency associated with the pixel(s). A weight (e.g., a level of transparency) being higher than another weight (e.g., another level of importance) can indicate that an order of integration for a foreground having the weight is different than an order of integration for another foreground having the other weight.

Additionally or alternatively, one or more weights can be utilized to modulate the alpha matt(s). By modulating the alpha matt(s), flexibility for utilizing one or more templates which require putting objects with overlaps on top of one another. By accounting for the object overlap(s), which may require more or less transparency by weighting the alpha matt(s) accordingly, the template(s) can be utilized to effectively present the object(s) in the composite image(s), in a clean and visually appealing manner.

The compose 226 can be utilized to adjust (or "rearrange") (or "modify") the object(s) based on the selected style and object integration information (or "object orchestration information). Adjusting the object(s), which can include one or more initial scales and/or one or more initial rotations, can include identifying the object integration information. The object integration information, which can, in some examples, include the initial scale(s) and the initial rotation(s), can include one or more adjusted scales, one or more translations (e.g., repositioning the object(s) more toward a top side, a bottom side, a left side, and/or a right side with respect to an original position, based on object positioning indicated by the template(s)), and/or one or more adjusted rotations associated with the object(s). By way of example, an adjusted scale, an adjusted translation, and an adjusted rotation associated with a selected object having an initial scale and an initial rotation can be identified by the compose 226. In such an example, an adjustment of an object scale (e.g., an initial scale), an object translation, and an adjustment of an object rotation (e.g., an initial rotation), can be performed by identifying, for a foreground that is detected as including the object, a bounding box of the detected foreground; and then by adjusting a foreground scale of the foreground, translating the foreground, and adjusting a foreground rotation of the foreground, by utilizing adjustments and/or translations of the bounding box (e.g., adjusting a bounding box scale, translating a bounding box, and/or adjusting a bounding box rotation).

The compose 226 can identify, generate, manage, and/or output a course composite virtual storefront image (or "course composite storefront image") based on the adjusted bounding box(es) and the bounding box information. The course composite image can be generated by moving the object(s) into one or more predicted outlines generated by the style aware outline prediction 224. The course composite storefront image can be generated based on output (e.g., the selected style) of the style selection 216. The bounding box(es) (e.g., the object scale, the object translation, and the object rotation) can be adjusted to have an accuracy that is greater than or equal to a threshold course accuracy. The threshold course accuracy can be lower than the threshold refined accuracy, as discussed below.

The style transfer 228 can be utilized to refine and/or finalize the composite storefront image to be a refined composite virtual storefront image (or "refined composite storefront image"). The refined composite storefront image can be generated, based on the course composite storefront image, with the refined composite storefront image having seamless boundaries between the object(s) and the background, and with seamless boundaries between different objects. The refined composite storefront image can be generated as an entirely different image based on the course composite storefront image by applying filters and/or synthesizing of a final filtered image generated as the refined composite storefront image. The refined composite storefront image can be generated to have an appearance that is homogenous from a user viewing perspective. The refined composite storefront image can be generated based on the on output (e.g., the selected style) of the style selection 216. The bounding box(es) (e.g., the object scale, the object translation, and the object rotation) can be adjusted to have an accuracy that is greater than or equal to a threshold refined accuracy. The threshold refined accuracy can be greater than the threshold course accuracy.

Although the single refined composite storefront image can be output, as discussed above in the current disclosure, it is not limited as such. Any number of refined composite storefront images, for example refined composite storefront images 230(A), 230(B), and 230(C) (collectively, "230"), can be output in a similar way as for the refined storefront image.

Although the style selection 216, the frame discovery 218, the matting 220, and the composite image orchestration 222, including one or more of the style aware outline prediction 224, the compose 226, and/or the style transfer 228, can be included in the ML model(s) (e.g., the ML model(s) 108), as discussed above in the current disclosure. Any of the style selection 216, the frame discovery 218, the matting 220, and the composite image orchestration 222, including one or more of the style aware outline prediction 224, the compose 226, and/or the style transfer 228 can be included in individual and separate ML models. Additionally or alternatively, any of the style selection 216, the frame discovery 218, the matting 220, and the composite image orchestration 222, including one or more of the style aware outline prediction 224, the compose 226, and/or the style transfer 228 can be included in one or more ML models that include any of the other components.

Although one or more of the components 200 (e.g., the style selection 216, the frame discovery 218, the matting 220, and the composite image orchestration 222, including one or more of the style aware outline prediction 224, the compose 226, and/or the style transfer 228) can operate based on the ML model(s) as discussed above in the current disclosure, it is not limited as such. The any of one or more of the style selection 216, the frame discovery 218, the matting 220, and the composite image orchestration 222, including one or more of the style aware outline prediction 224, the compose 226, and/or the style transfer 228, can utilize the ML model(s) and/or any types of computing algorithms and/or techniques to perform any operations of. Any of the ML model(s) can be trained utilizing output of any of one or more of the style selection 216, the frame discovery 218, the matting 220, and the composite image orchestration 222, including one or more of the style aware outline prediction 224, the compose 226, and/or the style transfer 228.

Although the metadata 204 can be included separately from the media content 202, as discussed above in the current disclosure, it is not limited as such. In some examples, the media content 202 can be included in the media content 202, which can be utilized as the media content, in addition or alternatively to the metadata 204, for implementing any of the techniques as discussed herein.

Figure 3:
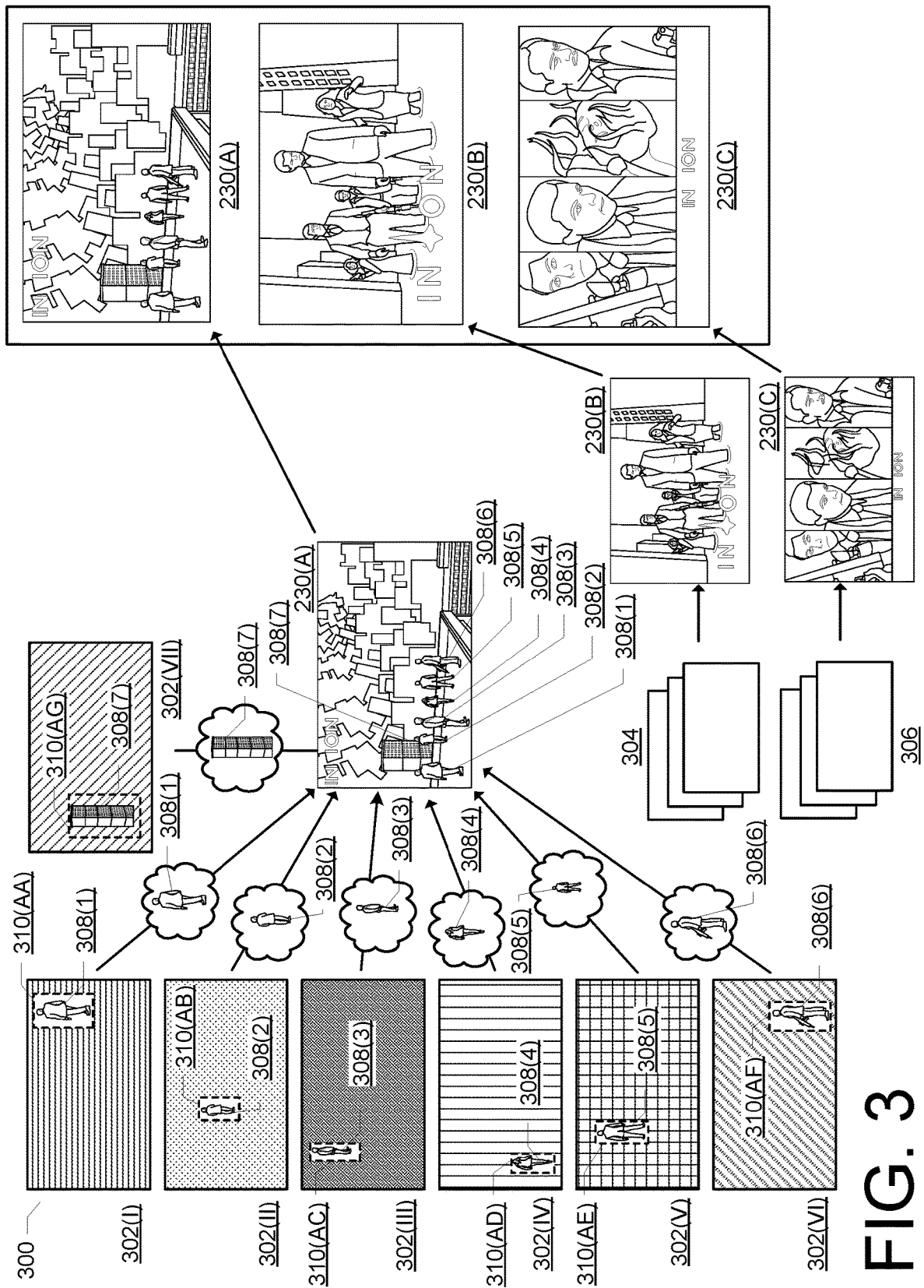
FIG. 3 illustrates a component diagram of example components in a composite storefront image generation system utilized to generate composite storefront images.

FIG. 3 illustrates a component diagram of example components 300 in a composite storefront image generation system utilized to generate composite storefront images. In some examples, the components 300, which can be utilized to implement the composite storefront image management system 102 as discussed above with reference to FIG. 1, and/or one or more of the style selection 216, the frame discover 218, the matting 220, and the composite image orchestration 222 as discussed above with reference to FIG. 2, can perform composite storefront image generation.

The components 300 can include one or more media content frame components (or "frame(s)") 302(I), 302(II), 302(III), 302(IV), 302(V), 302(VI), and 302(VII) (collectively 302) associated with media content (e.g., the media content 202 as discussed above with reference to FIG. 2. Additionally or alternatively, the components 300 can include one or more media content frame components (or "frame(s)") 304 and/or one or more media content frame components (or "frame(s)") 306 associated with the media content 202. Any or all frames of any of the frame(s) 302, the frame(s) 304, and/or the frame(s) 306 can be the same or different as any or all other frames of any others of the frame(s) 302, the frame(s) 304, and/or the frame(s) 306. Any of one or more frames (e.g., frame(s) 302, the frame(s) 304, the frame(s) 306, etc.) can be discovered (e.g., selected) by the frame discovery 218 based on initial (e.g., original) frames of the media content 202 in a similar way as discussed above with reference to FIG. 2.

One or more objects 308(1), 308(2), 308(3), 308(4), 308(5), 308(6), and 308(7) (collectively 308) can be identified in any of one or more frames (e.g., any of one or more of the frame(s) 302). Any of one or more objects (e.g., object(s) 308, etc.) can be discovered (e.g., selected) by the matting 220 in a similar way as discussed above with reference to FIG. 2. By way of example, the object 308(1) can be identified in the frame 302(I).

One or more frames associated with the media content 202 can be utilized to identify a background portion (or "background") of the course composite storefront image(s) and/or the refined composite storefront image(s). The course composite storefront image(s) and/or the refined composite storefront image(s) can be generated utilizing one or more background portions (or "backgrounds") identified and/or selected in one or more selected frame(s) and/or one or more original frames of the media content 202. The background(s) can be extracted from the frame(s) by the matting 220 in a similar way as discussed above with reference to FIG. 2.

Although a single object (e.g., one of the object(s) 308) can be selected from any frame (e.g., one of the frame(s) 302) as discussed above in the current disclosure, it is not limited as such. In some examples, any number of objects of any type (e.g., characters, buildings, etc.) can be selected from any frame, and/or any number of frames utilized for object selection.

One or more bounding boxes 310 (AA), 310 (AB), 310 (AC), 310 (AD), 310 (AE), 310 (AF), and 310 (AG) (collectively 310) can be identified based on any of one or more objects (e.g., any of one or more of the objects 308). Any of one or more bounding boxes (e.g., bounding boxes(s) 310, etc.) can be identified (e.g., generated) by the style aware outline prediction 224 in a similar way as discussed above with reference to FIG. 2. By way of example, the bounding box 310 (AA) can be identified based on the object 308(1).

One or more title logos associated with the media content 202 can be utilized to identify a title logo (or "logo") of the course composite storefront image(s) and/or the refined composite storefront image(s). The course composite storefront image(s) and/or the refined composite storefront image(s) can be generated utilizing one or more logos identified and/or selected in one or more selected frame(s) and/or one or more original frames of the media content 202. The logo(s) can be extracted from the frame(s) by the style aware outline prediction 224 in a similar way as discussed above with reference to FIG. 2. In some examples, the logo(s) utilized for the course composite storefront image(s) and/or the refined composite storefront image(s) can be selected from a single logo, or by multiple logos, identified in one or more of the frame(s). The logos can include textual representations of the media content 202 and/or titles of the media content 202, graphic representations of the media content 202 and/or the titles, and/or any other types of logos.

One or more objects can be utilized to generate one or more course composite storefront images, which can be utilized to generate one or more refined composite storefront images (e.g., the refined composite storefront images 230, as discussed above with reference to FIG. 2). By way of example, the object(s) 308 can be utilized to generate a course composite storefront image, which can be utilized to generate the refined composite storefront image 230(A). The course composite storefront image and/or the refined composite storefront image 230(A) can be generated by the composite image orchestration 222 (e.g., the compose 226 and/or the style transfer 228, respectively) in a similar way as discussed above with reference to FIG. 2. By way of example, the course composite storefront image and/or the refined composite storefront image 230(A) can be generated based on a style and/or a template selected by the style selection 216, as discussed above with reference to FIG. 2.

Although one or more objects (e.g., the object(s) 308) can be utilized to generate the course composite storefront image(s) that are utilized to generate the refined composite storefront image(s), as discussed above in the current disclosure, it is not limited as such. In some examples, one or more bounding boxes (e.g., the bounding box(es) 310), one or more foreground portions (or "foreground(s)"), and/or the object(s) 308 can be utilized to generate the course composite storefront image(s) and/or the refined composite storefront image(s).

As a hypothetical example, a user device can receive input from a user desiring to view information associated with available media content to be streamed and/or downloaded. The user device can transmit a request to a service provider system based on the user input. The service provider system can identify metadata associated with media content, and user information associated with the user and information utilized, to select items from among available media content based on the user information. The selected items can include media content, such as movies that are likely to be of interest to the user. For example, a movie can be selected based on metadata of the movie, and a browsing or viewing history of the user indicating that the movie is of the same genre and/or includes the same characters of other movies previously viewed, and/or previously mentioned in the user's browsing history.

In the hypothetical example, the service provider system can individually and selectively generate a customized composite storefront image for the movie to be presented to the user. The service provider system can analyze various styles that could be utilized to construct the customized composite storefront image. The styles being analyzed can include various styles of storefront artwork of other movies in the same genre, having the same actors and/or crew members, having similar plots or filming locations, and/or any other type of relevant information. Some of the styles can be selected, such as, if the movie to be presented includes fight scenes, action, and science fiction content, existing artwork styles of a movie with similar content (e.g., fight scenes, action, and science fiction content) can be selected as a template for the composite storefront image. The template can be constructed from a cluster of, or as a representation of, a set of existing artwork styles that have similar objects, formats, characters, or any other types of matching portrayals.

In the hypothetical example, the service provider system can select frames to be analyzed for obtaining information for creation of the composite storefront image. The selected frames can be identified based on various interval lengths, such as an interval length of 23 frames per second intervals (fps). The template can be utilized to analyze the selected frames to identify content that can be utilized to fill portions of the template. For example, if the template includes spaces for objects having certain attributes (e.g., objects that are human characters) and with certain characteristics (e.g., characters that are standing in certain positions and orientations, exhibiting certain actions, holding certain objects, having certain expressions, exhibiting certain emotions, being portrayed at certain sizes, etc.), the service provider system can scan the selected frames to identify any of the selected frames having those objects and those characteristics. The service provider system can scan the frames and identify which frames include any and all content suitable for filling in various aspects of the template, such as to identify buildings, environmental objects, such as trees and bushes, vehicles, backgrounds, logos, and any other content portrayed in the template. For example, the frames can be scanned to identify a frame with a building of a similar size, with similar dimensions and an orientation matching a space for a building in the template. Scanning of the frames can be performed by applying a foreground detection and matting prediction model. The foreground detection and matting prediction model can extract characters and objects of interest from the frames In the hypothetical example, the service provider system can utilize the frames discovered to have content suitable for filling in the template that is being utilized to construct the composite image. The content that is needed for constructing the composite image can be extracted from the frames. For example, the objects, such as characters and buildings, can be extracted from the frames by detecting foreground portions of the frames associated with the objects. Extraction of the content can be performed by predicting bounding box locations of each detected foreground and determining overlay orders and weights for alpha scores to mimic a target style of the template. The frames can also be scanned to predict a bounding box for a logo in the frames, as well as a color of the logo, to match the target style.

In the hypothetical example, the service provider system can scale, translate, and rotate each foreground according to the predicted bounding box and place the foreground in the specified location of a course composite image based on the template. The course composite image can then be mapped to the target style of the template in a refined manner, to create a refined composite image.

Any number of refined composite images can be created for the video in a similar way as discussed above, such as by using the metadata and user information to create the different refined composite images. The refined composite images can be generated for any number of movies or any types of other media content, which can be presented to the user.

Although generation of the refined composite images can occur based on users requests, it is not limited as such. Composite image generation can occur at any time, before or after user requests are received. Composite image generation can be performed for different types of media content, based on different groups of users having shared characteristics or similar types of user information. The different composite images can be generated, for example, for various movies that are likely to be viewed by the groups and/or the users, in a similar way as for a single user.

In the hypothetical example, the refined composite images can be transmitted to the user devices. Presentation of the refined composite images by the users devices can enable the users to quickly view information about the movies that is obtainable via the refined composite images, in an easy and effective manner. The user devices can receive various types of selections of the refined composite images, which can be utilized to perform various processes. For example, users can input selections associated with the refined composite images to view additional information about the movies, view similar movies, view movies with similar refined composite images, view movies with content that is usable to create similar refined composite images, stream or download the movies, request to receive different refined composite images (e.g., a refined composite image that was previously created, or a different refined composite image to be created based on the request) for the movie or other movies, etc.

In the hypothetical example, the composite images displayed by the user devices can include various content enabling interaction between the composite image, the user device, and/or the user. The composite images can include mark-ups and/or visual depictions and/or overlays (e.g., dotted lines) identifying the portions (e.g., object(s) of the composite images. By way of example, the dotted lines can encircle, box in, or outline the object(s), the background, the logo, and/or any other image content. The user may select, via a mouse click and/or keyboard input, and/or any other type of input, the dotted lines, and/or the object(s) in the dotted lines. In some examples, the dotted lines can remain hidden or be omitted from the composite images until a mouse icon (e.g., a mouse arrow) is positioned to overlap the object(s) or the dotted lines, at which point the dotted lines can be displayed. In some examples, brightness, sharpness, color, and/or any other characteristic of the dotted lines can be increased, amplified, and/or changed as the mouse icon approaches the object(s) and/or the dotted lines.

In the hypothetical example, user selection of any portions of the imaged, such as the outlined object(s) (e.g., the object(s) outlined by the dotted lines), can enable the user to interact with the composite images. The user selection can be received and utilized, based on one or more types of user selection and/or one or more options identified via the user selection, to output (e.g., display) any type of information about the object(s), any other relevant media content associated with the object(s), any type of information about the relevant media content, the media content associated with the composite image(s), via streaming, displaying, downloading, etc.

Figure 4:
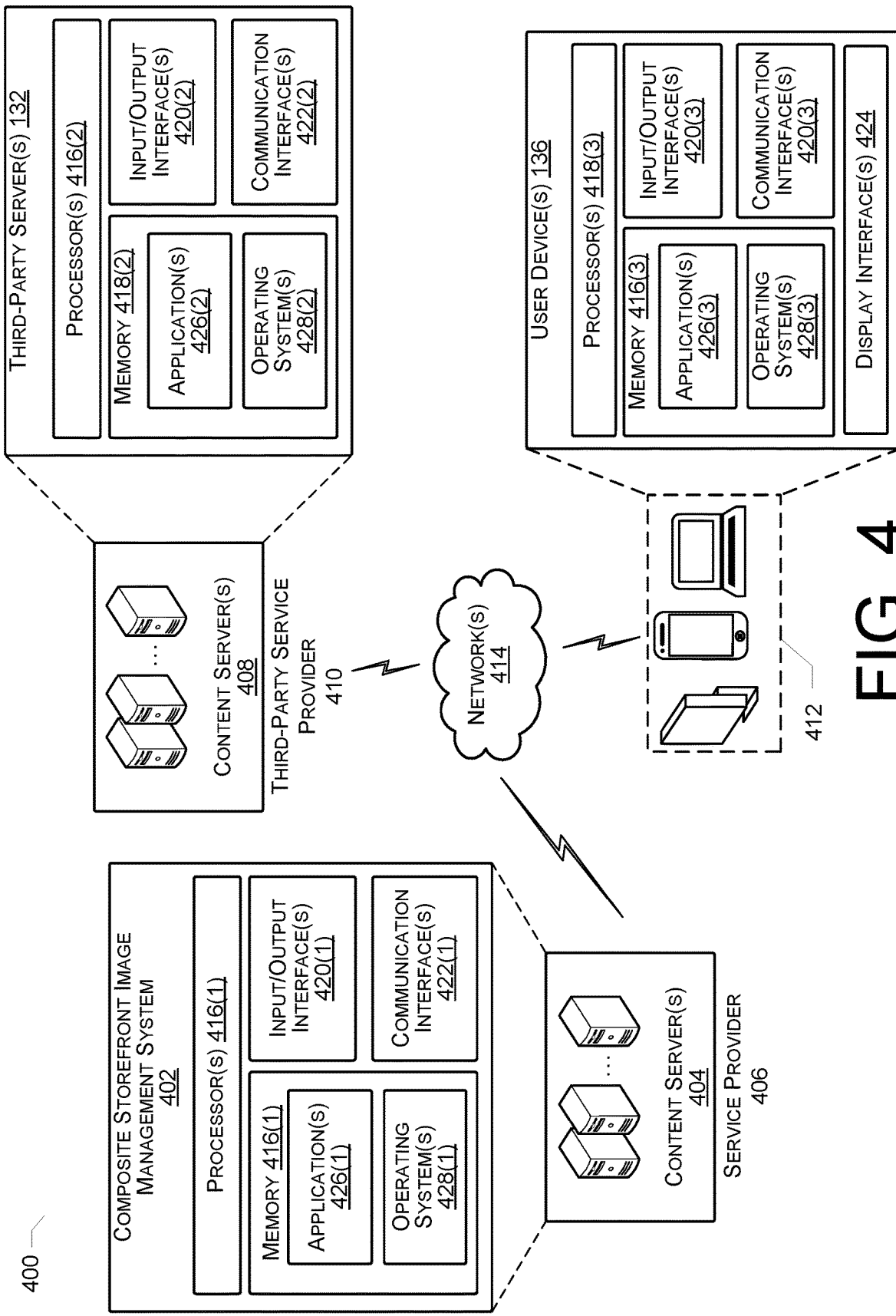
FIG. 4 is a schematic diagram of an illustrative computing architecture for multiple systems for managing composite storefront images.

FIG. 4 is a schematic diagram of an illustrative computing architecture 400 for multiple systems for managing composite storefront images. The computing architecture 400 may include a composite storefront image management system 402 (e.g., a composite virtual storefront image management system), which can include one or more content servers 404 associated with a service provider 406. The content server(s) 404 may be included in, and utilized to implement any functions of, the composite storefront image management system 102 shown in FIG. 1.

The computing architecture 400 may include one or more third-party content servers 408, which may be associated with a third-party service provider 410. The third-party content server(s) 408 may be included in, and utilized to implement any functions of, one or more third-party server(s) (e.g., the third-party server(s) 130 shown in FIG. 1) as discussed throughout this disclosure.

The computing architecture 400 may include one or more user devices 412. The user devices 412 may be included in, and utilized to implement any functions of, one or more user devices (e.g., user device(s) 136 shown in FIG. 1) as discussed throughout this disclosure.

The content server(s) 404, and the third-party content server(s) 408, and/or the user device(s) 412 may be configured to communicate with one another via one or more networks 414. The user device(s) 412 may communicate with the content server(s) 404 and the third-party content server(s) 408, such as to transmit requests to, and receive responses from, the content server(s) 404 and the third-party content server(s) 408. The user device(s) 412 may transmit any information associated with the requests to, and receive any information associated with the responses from, the content server(s) 404 and the third-party content server(s) 408. The user device(s) 412 may communicate between one another utilizing the network(s) 414. The content server(s) 404 may transmit any information associated with the requests to, and receive any information associated with the responses from, the third-party content server(s) 408. The third-party content server(s) 408 may transmit any information associated with the requests to, and receive any information associated with the responses from, the content server(s) 404.

The network(s) 414 may include the Internet, cable networks, cellular networks, wireless networks (e.g., Wi-Fi) and/or wired networks, as well as close-range communications such as Bluetooth®, Bluetooth® low energy, or the like. The content server(s) 404, and the third-party content server(s) 408, and/or the user device(s) 412 may communicate among one another utilizing the same type, or different types, of networks (e.g., networks with different protocols). The network(s) 414 may include the Internet, cable networks, cellular networks, wireless networks (e.g., Wi-Fi) and/or wired networks, as well as close-range communications such as Bluetooth®, Bluetooth® low energy, or the like).

The user device(s) 412 may represent, but are not limited to, televisions (TVs), cellular telephones, desktop computers, server computers or blade servers such as web-servers, map-reduce servers, or other computation engines or network-attached storage units, personal computers, mobile computers, laptop computers, tablet computers, telecommunication devices, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, voice-enabled device(s), or any other sort of computing device coverable of sending communications and performing the functions according to the techniques described herein. Among these TVs are liquid crystal display (LCD) TVs, light emitting diode (LED) TVs, organic light emitting diode (OLED) TVs, plasma display devices (PDP) TVs, quantum dot (QLED) TVs, and electroluminescent (ELD) TVs. In some examples, the voice-enabled device(s) of the user device(s) 412 may include devices with or without display components. In some examples, the display device(s) of the user device(s) 412 may include devices with or without speech processing components.

In the illustrated example, the content server(s) 404, and the third-party content server(s) 408, and/or the user device(s) 412 include one or more processors 416(1), 416(2), and/or 416(3) (collectively processor(s) 416), at least one memory 418(1), 418(2), and/or 418(3) (collectively memory 418), one or more input/output (I/O) interfaces 420(1), 420(2), and/or 420(3) (collectively I/O interface(s) 420), and/or one or more communication (e.g., network) interfaces 422(1), 422(2), and/or 422(3) (collectively communication interface(s) 422). The user device(s) 412 may include one or more display interfaces 424. In some examples, one or more of the voice-controlled device(s) among the user device(s) 412 are controlled only by voice and do not include any display interface.

Each processor 416 may include multiple processors and/or a processor having multiple cores. Further, the processor(s) 416 may include one or more cores of different types. For example, the processor(s) 416 may include application processor units, graphic processing units, and so forth. In various examples, the processor(s) 416 may include one or more microprocessors, microcomputers, microcontrollers, digital signal processors, central processing units, state machines, logic circuitries, and/or any devices that manipulate signals based on operational instructions. In some examples, the processor(s) 416 may include one or more hardware processors and/or logic circuits of any suitable type specifically programmed or configured to execute the algorithms and processes described herein.

For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 416 may possess its own local memory, which also may store program components, program data, and/or one or more operating systems.

In some examples, the processor(s) 416 may be configured to fetch and execute computer-readable processor-executable instructions stored in the memory 418. Depending on the configuration of the content server(s) 404, and the third-party content server(s) 408, and/or the user device(s) 412, the memory 418 may be an example of tangible non-transitory computer storage media and may include volatile and nonvolatile memory and/or removable and non-removable media implemented in any type of technology for storage of information such as computer-readable processor-executable instructions, data structures, program modules or other data. Such memory 418 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. The memory 418 may be implemented as computer-readable storage media ("CRSM"), which may be any available physical media accessible by the processor(s) 416 to execute instructions stored on the memory 418. In some examples, CRSM may include random access memory ("RAM") and Flash memory. In other examples, CRSM may include, but is not limited to, read-only memory ("ROM"), electrically erasable programmable read-only memory ("EEPROM"), or any other tangible medium which may be used to store the desired information, and which may be accessed by the processor(s) 416.

The memory 418 may be used to store and maintain any number of functional components that are executable by the processor 416. In some examples, these functional components include instructions or programs that are executable by the processor 416 and that, when executed, implement operational logic for performing the actions and services attributed above to the content server(s) 404, and the third-party content server(s) 408, and/or the user device(s) 412. Functional components of the content server(s) 404, and the third-party content server(s) 408, and/or the user device(s) 412 stored in the memory 418(1), 418(2), and/or 418(3) may include applications 426(1), 426(2), and/or 426(3) (collectively applications 426). The application(s) 426 may configure the respective devices to perform functions described herein such as with regard to FIGS. 1-3 and 4.

The functional components of the content server(s) 404, and the third-party content server(s) 408, and/or the user device(s) 412 stored in the memory 418(1), 418(2), and/or 418(3) may additionally include operating systems 428(1), 428(2), and/or 428(3), respectively (collectively operating systems 428). The operating system(s) 428 for controlling and managing various functions of the content server(s) 404, and the third-party content server(s) 408, and/or the user device(s) 412. The memory 418 may also store other modules and data, which may include programs, drivers, etc., and the data used or generated by the functional components, to enable efficient and effective food order processing. Further, the content server(s) 404, and the third-party content server(s) 408, and/or the user device(s) 412 may include many other logical, programmatic and physical components, of which those described are merely examples that are related to the discussion herein. In addition, the memory 418 may also store data, data structures and the like, that are used by the functional components.

The I/O interface(s) 420, may include scanners (e.g., for scanning bar codes, QR codes, etc.), speakers, a microphone, a camera, and various user controls (e.g., buttons, a joystick, a keyboard, a keypad, etc.), a haptic output device, and so forth. The communication interface(s) 422 may include one or more interfaces and hardware components for enabling communication with various other devices over the network or directly.

Although the terms "user" and "operator" are used for simplicity and/or clarity throughout the current disclosure, it is not limited as such. In some examples, any of the terms including "user" and "operator" can be utilized interchangeably, and/or interpreted in a similar way, with respect to any of the techniques discussed herein.

Figure 5:
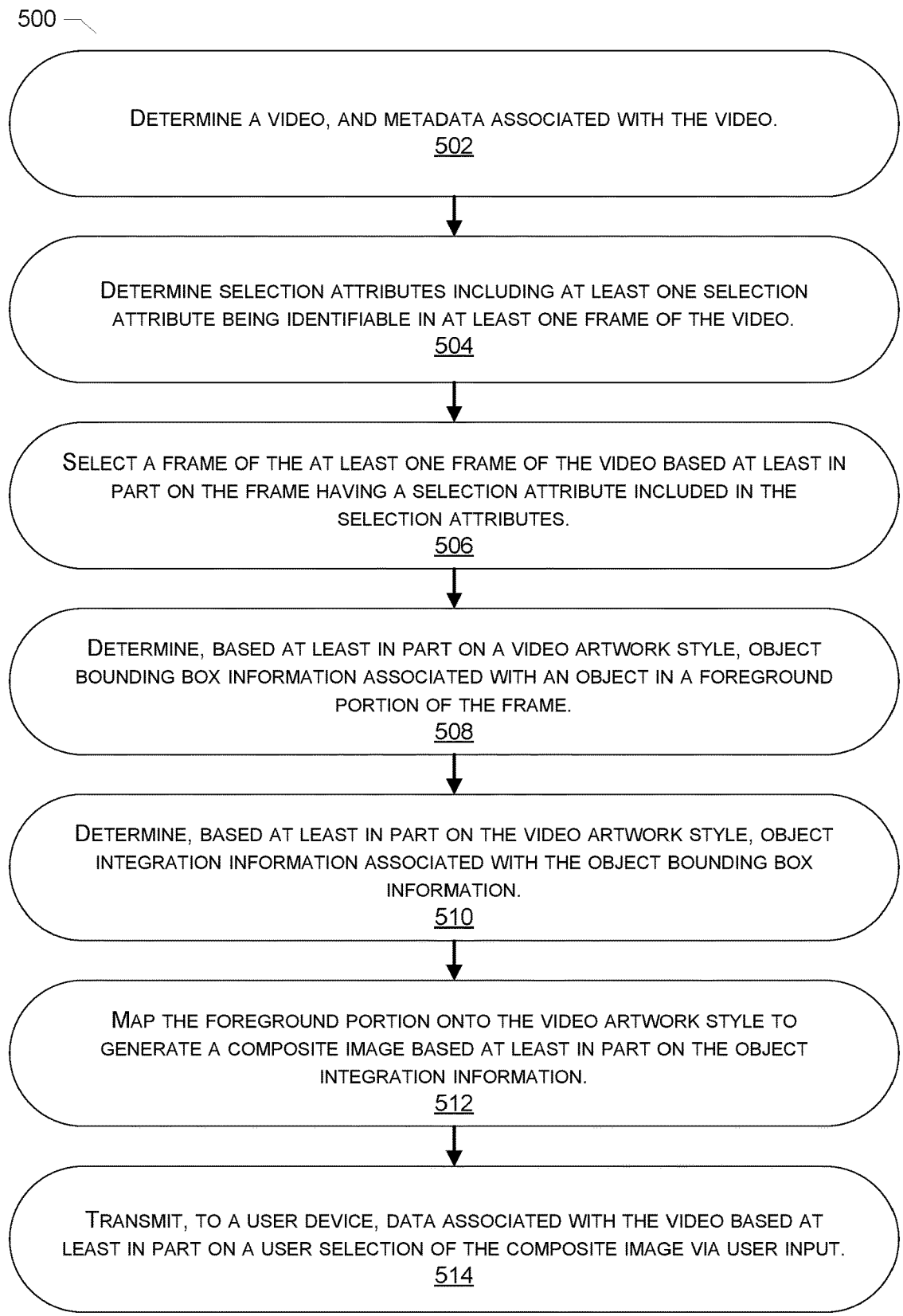
FIG. 5 is a flow diagram of an illustrative process for managing composite storefront images.

FIG. 5 is a flow diagram of an illustrative process 500 for managing composite storefront images.

At 502, the process 500 can include determining a video, and metadata associated with the video. In some examples, media content 202, such as the video, and the metadata (e.g., the metadata 204) can be determined. The metadata 204 can include title name(s) 206, attribute(s) 208, plot keyword(s) 210, synopsis(es) 212, and/or genre(s) 214.

At 504, the process 500 can include determining selection attributes including at least one selection attribute being identifiable in at least one frame of the video. The selection attribute(s) can include one or more frame selection information, which can include one or more of frame identifiers, frame descriptions, frame characteristics, frame creation dates, frame attributes, etc.

At 506, the process 500 can include selecting a frame of the at least one frame of the video based at least in part on the frame having a selection attribute included in the selection attributes. The selected frame can be determined based on the selected frame including, for example, an attribute such as a character (e.g., main character) of the video and/or a characteristic such as image sharpness level above a threshold image sharpness level.

At 508, the process 500 can include determining, based at least in part on a video artwork style, object bounding box information associated with an object (e.g., the object 308(1) in a foreground portion of the frame (e.g., the frame 302(I)). The object bounding box information can be associated with an object bounding box (e.g., the bounding box 310(AA)) associated with the object 308(1).

At 510, the process 500 can include determining, based at least in part on the video artwork style, object integration information associated with the object bounding box information. The object integration information can include an initial scale, an initial rotation, an adjusted scale, a translation, and/or an adjusted rotation associated with the object 308(1).

At 512, the process 500 can include mapping the foreground portion onto the video artwork style to generate a composite image based at least in part on the object integration information. One or more composite images including the composite image (e.g., the refined composite storefront image 230(A)) can be generated based on the initial scale, the initial rotation, the adjusted scale, the translation, and/or the adjusted rotation associated with the object 308 (1).

At 514, the process 500 can include transmitting, to a user device, data associated with the video based at least in part on a user selection of the composite image via user input. The transmitted data can be utilized by a user device to stream and/or download the video, based no selection of the refined composite storefront image 230(A).

Although the term "user" is utilized throughout this disclosure, it is not limited as such and the term "user" is utilized for simplicity. The term "user" as used throughout disclosure may denote any type of user, including a user, an administrator, a user profile or user account associated with a user, etc.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system comprising:
   at least one processor; and
   at least one non-transitory computer-readable storage medium having computer-executable instructions stored thereon which, when executed by the at least one processor, cause the system to perform operations comprising:
      storing historical media content artwork in a historical media content artwork database, the historical media content artwork being associated with one or more videos of a plurality of videos;
      determining a video of the plurality of videos, and metadata associated with the video;

determining selection attributes including at least one selection attribute being identifiable in at least one frame of the video;

selecting a frame of the at least one frame of the video based at least in part on the frame having a selection attribute included in the selection attributes;

determining, based at least in part on a video artwork style of the historical media content artwork, object bounding box information associated with an object in a foreground portion of the frame:

determining, based at least in part on the video artwork style, object integration information associated with the object bounding box information;

mapping the foreground portion onto the video artwork style to generate a composite image based at least in part on the object integration information; and transmitting, to a user device, data associated with the video based at least in part on a user selection of the composite image via user input received from the user device.

2. The system of claim 1, wherein:

the object bounding box information is associated with an object bounding box associated with the object; and determining the object integration information further comprises identifying, based at least in part on the video artwork style, an object bounding box associated with the object, and logo information associated with a title logo of the video, the object bounding box information being associated with the object bounding box, the video artwork style including a template representative of at least one manually created image.

3. The system of claim 1, the operations further comprising:

utilizing a foreground detection and matting prediction model to estimate at least one of an initial size or an initial location of the object; and extracting the object in the foreground portion of the frame based at least in part on the at least one of the initial size or the initial location of the object.

4. The system of claim 1, wherein the object bounding box information is associated with an object bounding box associated with the object, and mapping the foreground portion further comprises:

determining video integration information based at least in part on the video artwork style, the video integration information including the object integration information and logo integration information, the object integration information being associated with the object bounding box and the object bounding box information, the logo integration information associated with a title logo associated with the video; and mapping the foreground portion and the title logo onto the video artwork style to generate the composite image.

5. The system of claim 1, the operations further comprising:

training a machine learning (ML) model to generate a trained ML model based at least in part on the historical media content artwork, the historical media content artwork including at least one manually created image associated with at least one video or metadata; and utilizing, as a foreground detection and matting prediction model, the trained ML model to extract the object.

6. The system of claim 1, the operations further comprising:

training, based at least in part on at least one image cluster in the historical media content artwork, a machine learning (ML) model to generate a trained ML model, the ML model being trained further based at least in part on at least one training object bounding box, the at least one training object bounding box being associated with at least one training object extracted from at least one training image in the at least one image cluster; and utilizing, as a foreground detection and matting prediction model, the trained ML model to extract the object.

7. The system of claim 1, the operations further comprising:

selecting the video artwork style based at least in part on the metadata, the metadata including at least one of a video identifier, a title, a genre, a synopsis, a keyword, or a video attribute associated with the video.

8. The system of claim 1, wherein the composite image is a course composite image, and mapping the foreground portion onto the video artwork style further comprises:

predicting a style aware outline associated with the video, based at least in part on the historical media content artwork;

composing the foreground portion by at least one of scaling, transferring, or rotating the foreground portion based at least in part on the style aware outline; and mapping the foreground portion onto the video artwork style to refine the course composite image to be a refined composite image.

9. A method comprising:

storing historical media content artwork associated with at least one media content item;

determining metadata associated with the at least one media content item;

determining selection attributes including at least one selection attribute being identifiable in at least one fragment of a media content item of the at least one media content item;

selecting a fragment of the least one fragment of the media content item based at least in part on the fragment having a selection attribute included in the selection attributes;

determining, based at least in part on a media content artwork style of the historical media content artwork, object bounding box information associated with an object in a foreground section of the fragment of the media content item;

determining, based at least in part on the media content artwork style, object integration information associated with the object bounding box information;

mapping the foreground section onto the media content artwork style to generate a composite image based at least part on the object integration information; and transmitting, to a user device, data associated with the media content item based at least in part on a user selection of the composite image via user input received from the user device.

10. The method of claim 9, wherein identifying the object integration information further comprises:

determining, based at least in part on an image template in the media content artwork style, an object bounding box associated with the object, and logo information associated with a title logo of the media content item, the object bounding box information being associated with the object bounding box, the image template being representative of at least one manually created image.

11. The method of claim 9, wherein the object is a first object that is a non-human object, the object bounding box information is first object bounding box information associated with a first object bounding box associated with the first object, the foreground section is a first foreground section, and the fragment of the media content item is a first fragment of the media content item, further comprising:
  matting, based at least in part on background information associated with at least one background portion in the media content item, the first foreground section to identify first matted foreground information, and a second foreground section associated with a second object in a second fragment of the media content item to identify second matted foreground information, the second object being a human; and
  utilizing the first matted foreground information to identify the first object bounding box, and the second matted foreground information to identify a second object bounding box associated with the second object.

12. The method of claim 9, further comprising:
  training a machine learning (ML) model based at least in part on the historical media content artwork to generate a trained ML model, the historical media content artwork including at least one manually created image associated with the at least one media content item; and
  utilizing, as a foreground detection and matting prediction model, the trained ML model to extract the object.

13. The method of claim 9, further comprising:
  training, based at least in part on at least one image cluster in the historical media content artwork, a machine learning (ML) model to generate a trained ML model, the ML model being trained to generate the trained ML model further based at least in part on at least one training object bounding box, the at least one training object bounding box being associated with at least one training object extracted from at least one training image in the at least one image cluster; and
  utilizing, as a foreground detection and matting prediction model, the trained ML model to extract the object.

14. The method of claim 9, further comprising:
  selecting the media content artwork style based at least in part on the metadata, the metadata including at least one of a media content identifier, a title, a genre, a synopsis, a keyword, or a media content attribute associated with the media content item.

15. The method of claim 9, wherein the composite image is a course composite image, and mapping the foreground section onto the media content artwork style further comprises:
  predicting a style aware outline associated with the media content item, based at least in part on the historical media content artwork;
  composing the foreground section by at least one of scaling, transferring, or rotating the foreground section based at least in part on the style aware outline; and
  mapping the foreground section onto the media content artwork style to refine the course composite image to be a refined composite image.

16. A system comprising:
  at least one processor; and
  at least one non-transitory computer-readable storage medium having computer-executable instructions stored thereon which, when executed on the at least one processor, cause the system to perform operations comprising:
    storing historical media content artwork in a historical media content artwork database, the historical media content artwork including manually created images associated with a plurality of videos;
    identifying media content, and metadata associated with the media content, the media content including a video or a trailer associated with the video, the trailer including video content associated with, but equal to or shorter in length than, the video:
    identifying a list of selection attributes utilized for frame selection, the list of selection attributes including selection attributes being identifiable in frames of the media content, the selection attributes being characteristics or descriptive of content portions of the frames of the media content;
    selecting a frame of the frames of the media content based on the frame having a selection attribute in the list of selection attributes:
    utilizing a foreground detection and matting prediction model to extract an object in a foreground portion of the frame;
    identifying, based on a video artwork style of the historical media content artwork, an object bounding box associated with the object, object bounding box information associated with the object bounding box, and logo information associated with a title logo of the video, the video artwork style including templates representative of a manually created images set of the manually created images;
    identifying integration information based on the video artwork style, the integration information including object integration information associated with the object bounding box and the object bounding box information, the object integration information being utilized to modify at least one of a first location or a first size of the object bounding box, the integration information including logo integration information being utilized to modify at least one of a second location or a second size of the title logo;
    integrating the foreground portion and the title logo into a course composite image based on the integration information;
    mapping the foreground portion and the title logo onto the video artwork style to generate a refined composite image, the refined composite image having a first level of visual quality that is greater than or equal to a second level of visual quality of the course composite image;
    transmitting the refined composite image to a user device; and
    transmitting, to the user device, data associated with the media content based on a user selection of the refined composite image via user input received by a user interface presented via the user device.

17. The system of claim 16, the operations further comprising:
  training a machine learning (ML) model based on training attributes and training attribute information associated with the historical media content artwork to generate a trained ML model,
  wherein the identifying the list of selection attributes further comprises:
    identifying the training attributes from among a subset of the selection attributes in the list of selection attributes, based on operator selections confirming accuracy of the subset of selection attributes via operator input received by a user interface presented via an operator device; and
    storing the training attribute information, the training attribute information including attribute identifiers associated with the training attributes, the training attribute information further including frame identifiers associated with training frames in which the training attributes are identified, wherein selecting the frame further comprises;

utilizing the trained ML model to identify a candidate attribute in a frame based on a similarity of the candidate attribute and a trained attribute being greater than or equal to a threshold similarity; and selecting the frame based on the frame having the candidate attribute, and wherein utilizing the foreground detection and matting prediction model further comprises:

utilizing the trained ML model to identify the object having the candidate attribute, estimating a size and a location of the object, and extracting the object in the foreground portion of the frame based on the size and the location of the object.

18. The system of claim 16, wherein identifying the logo information further comprises:

identifying at least one of a logo bounding box or a color associated with the title logo;

identifying logo bounding box information including a logo bounding box size, a logo bounding box x-coordinate, a logo bounding box y-coordinate, a logo bounding box height, a logo bounding box width, and a logo bounding box identifier associated with the logo bounding box; and storing the logo information, the logo information including the title logo, the logo bounding box information, and a logo frame identifier associated with a logo frame in which the title logo is identified.

19. The system of claim 16, the operations further comprising:

storing the metadata, the metadata including selection video identifiers, selection titles, selection genres, selection synopses, selection keywords, selection frame attributes associated with the frames, and selection media content attributes associated with the media content, the selection frame attributes being characteristics or descriptive of frame portions of the frames, the selection media content attributes being characteristics or descriptive of amalgamated subsets of frames from among the frames; and selecting the video artwork style based on i) a frame attribute similarity between a selection frame attribute and a frame attribute of the frame being greater than or equal to a threshold frame attribute similarity, and ii) a media content attribute similarity between a selection media content attribute and a media content attribute of the media content being greater than or equal to a threshold media content attribute similarity.

20. The system of claim 16, wherein:

the video artwork style is a first video artwork style;

the manually created images set in the historical media content artwork include a first manually created image and a second manually created image;

the first manually created image and the second manually created image are stored in a first cluster associated with a first style;

the first cluster and a second cluster are associated with a second video artwork style and are stored in a cluster array, the second cluster including a third manually created image and a fourth manually created image; and the first cluster and the second cluster are identified by executing a clustering algorithm on the historical media content artwork.

* * * * *